US008952923B2

(12) United States Patent
Mizuhashi et al.

(10) Patent No.: US 8,952,923 B2
(45) Date of Patent: Feb. 10, 2015

(54) TOUCH DETECTION FUNCTION-ATTACHED DISPLAY APPARATUS, DRIVING METHOD AND DRIVING CIRCUIT THEREFOR WITH SWITCHABLE AC AND DC DRIVING, AND ELECTRONIC APPARATUS

(75) Inventors: Hiroshi Mizuhashi, Kanagawa (JP); Yoshitoshi Kida, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 418 days.

(21) Appl. No.: 13/137,344

(22) Filed: Aug. 8, 2011

(65) Prior Publication Data

US 2012/0068961 A1 Mar. 22, 2012

(30) Foreign Application Priority Data

Sep. 17, 2010 (JP) ................. 2010-209716

(51) Int. Cl.
*G06F 3/045* (2006.01)
*G09G 3/36* (2006.01)
*G06F 3/041* (2006.01)
*G06F 3/044* (2006.01)

(52) U.S. Cl.
CPC ............ *G06F 3/0412* (2013.01); *G06F 3/0416* (2013.01); *G06F 3/044* (2013.01); *G09G 3/3655* (2013.01); *G09G 3/3677* (2013.01)
USPC ........................................... 345/174; 345/87

(58) Field of Classification Search
USPC ........................................................ 345/174
See application file for complete search history.

(56) References Cited

U.S. PATENT DOCUMENTS

| 2004/0227743 | A1* | 11/2004 | Brown ........................ 345/204 |
| 2006/0132463 | A1* | 6/2006 | Lee et al. ...................... 345/173 |
| 2008/0309627 | A1* | 12/2008 | Hotelling et al. ............. 345/173 |
| 2009/0251434 | A1* | 10/2009 | Rimon et al. ................. 345/173 |
| 2009/0256818 | A1 | 10/2009 | Noguchi et al. |
| 2010/0253638 | A1* | 10/2010 | Yousefpor et al. ............ 345/173 |

FOREIGN PATENT DOCUMENTS

JP 2009-258182 11/2009

* cited by examiner

*Primary Examiner* — William Boddie
*Assistant Examiner* — Andrew Schnirel
(74) *Attorney, Agent, or Firm* — Rader, Fishman & Grauer PLLC

(57) ABSTRACT

Provided is a touch-detection-function-attached display apparatus including: common-driving electrodes disposed in parallel to extend in one direction; a display device performing display based on pixel and display-driving signals; a touch-detection device detecting an externally-approaching object based on a touch-detection-driving signal; and a scan-driving unit performing a first-scan driving for sequentially-applying the display-driving signal to the common-driving electrodes in a time-division manner and a second-scan driving for sequentially-applying the touch-detection-driving signal to the common-driving electrodes in a time-division manner at a scan speed different from the first-scan-driving and applying a DC potential to the common-driving electrode which is not selected as an object of the first and second scan driving, wherein the touch-detection-driving signal includes a DC portion sustained at the DC potential in a time interval where the pixel signal is applied to the display device and a pulse portion in a time interval other than the pixel-signal-application time interval.

11 Claims, 25 Drawing Sheets

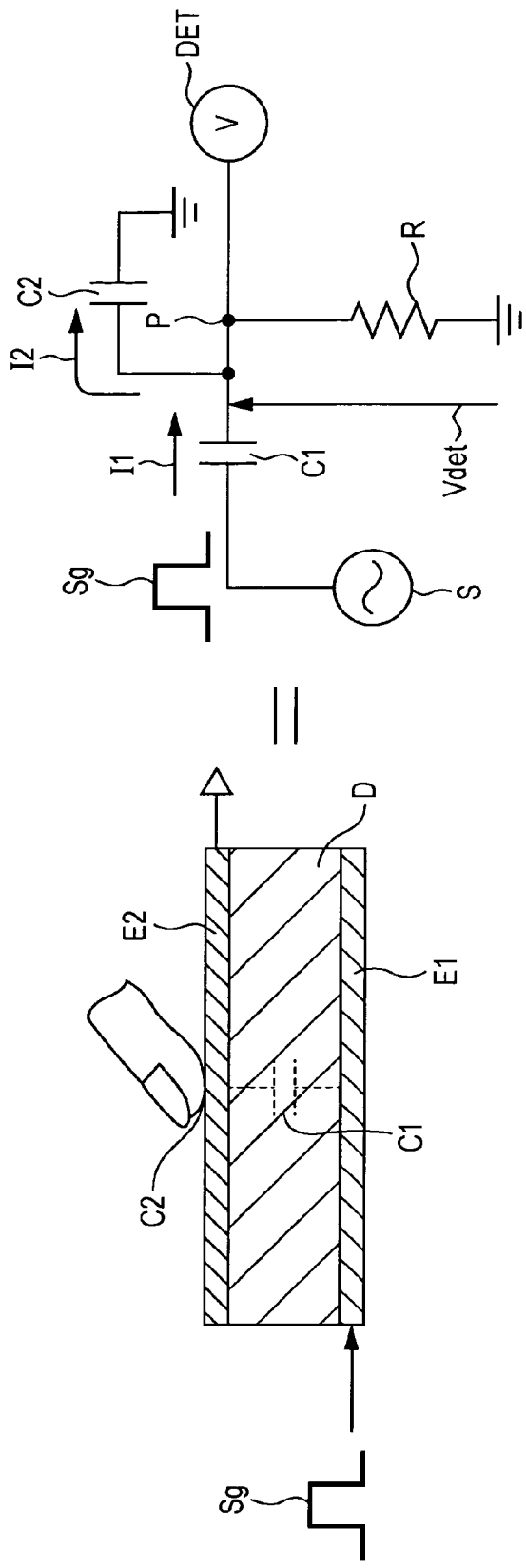

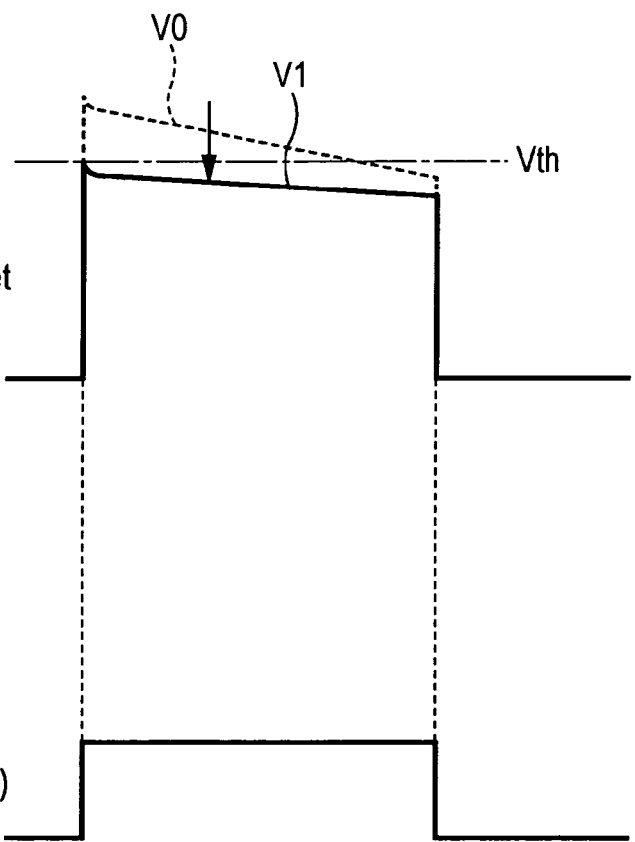

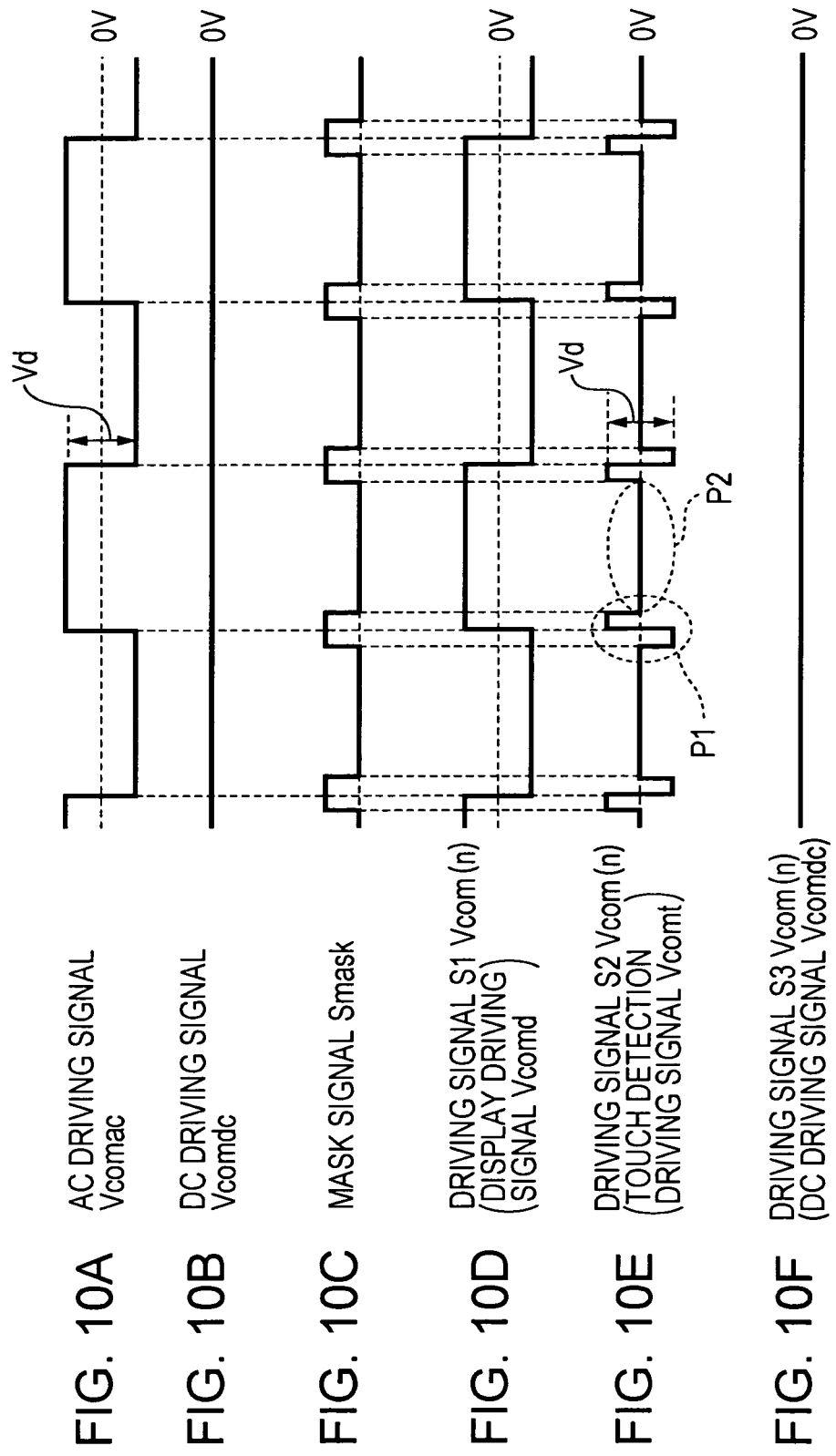

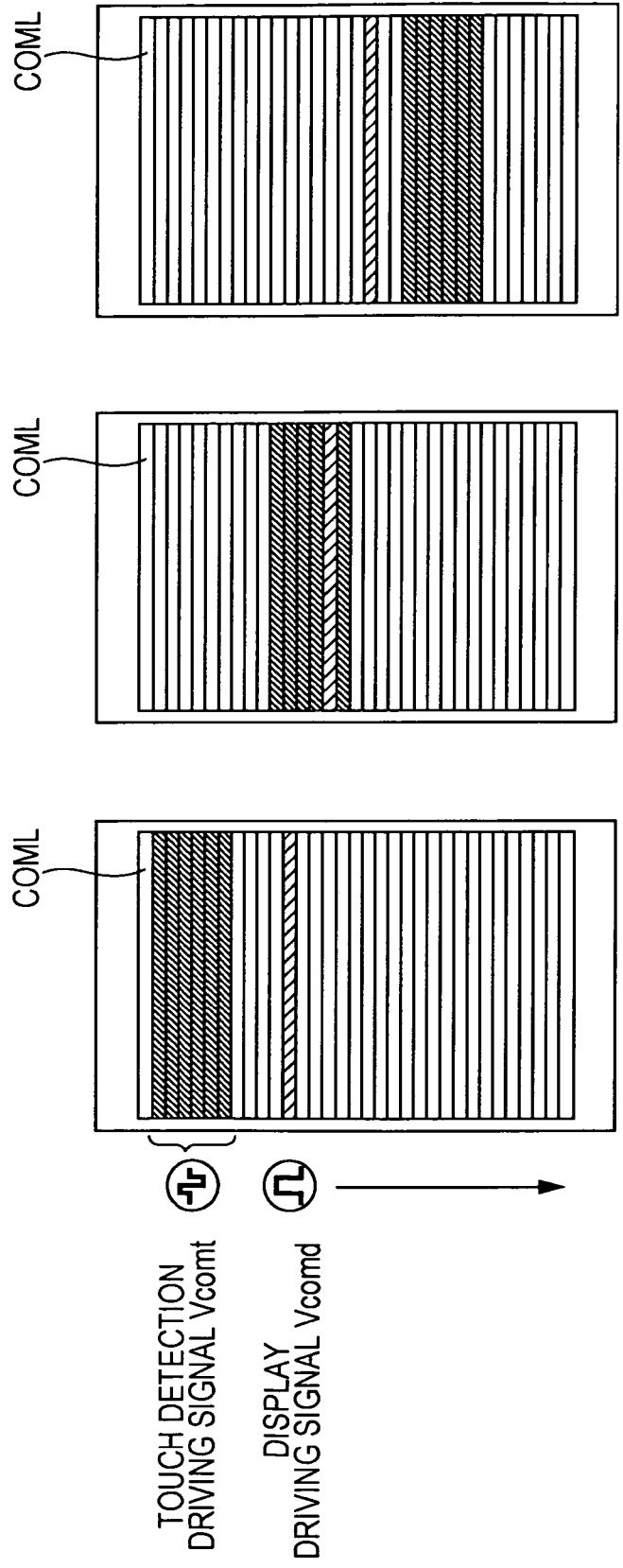

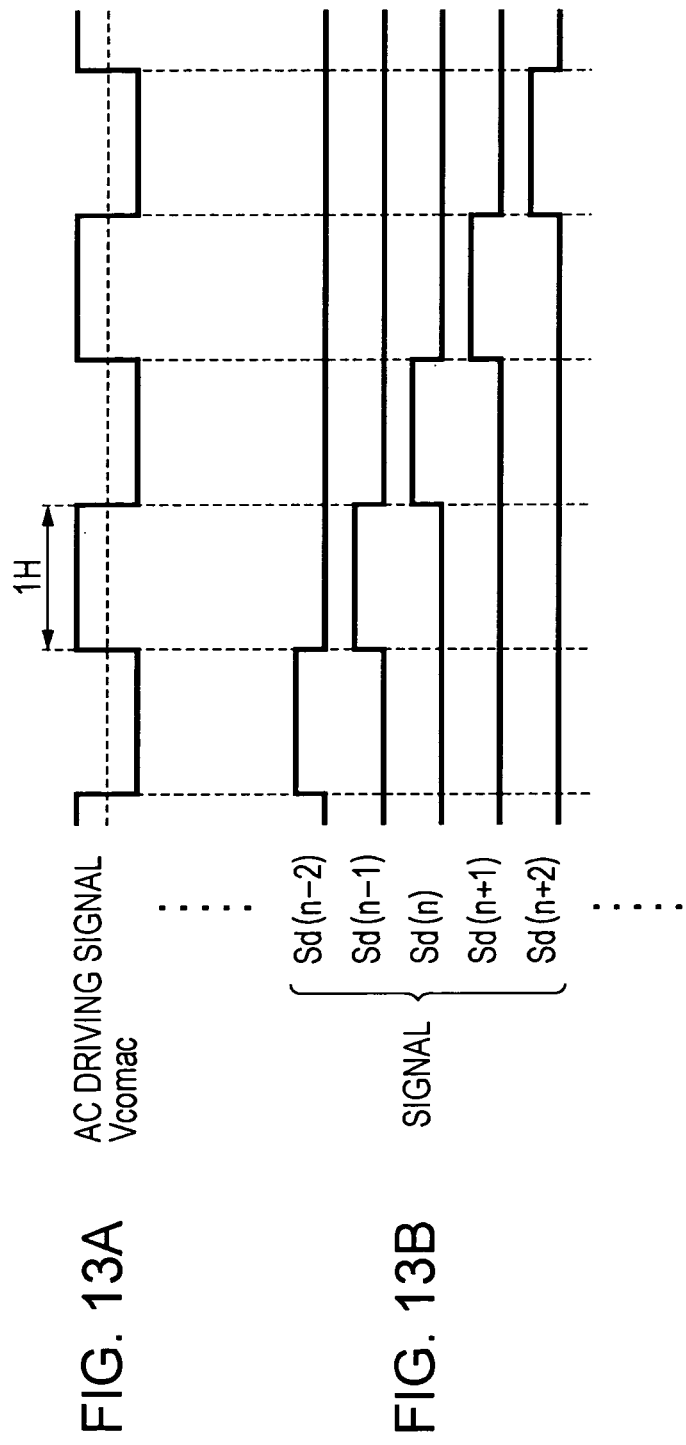

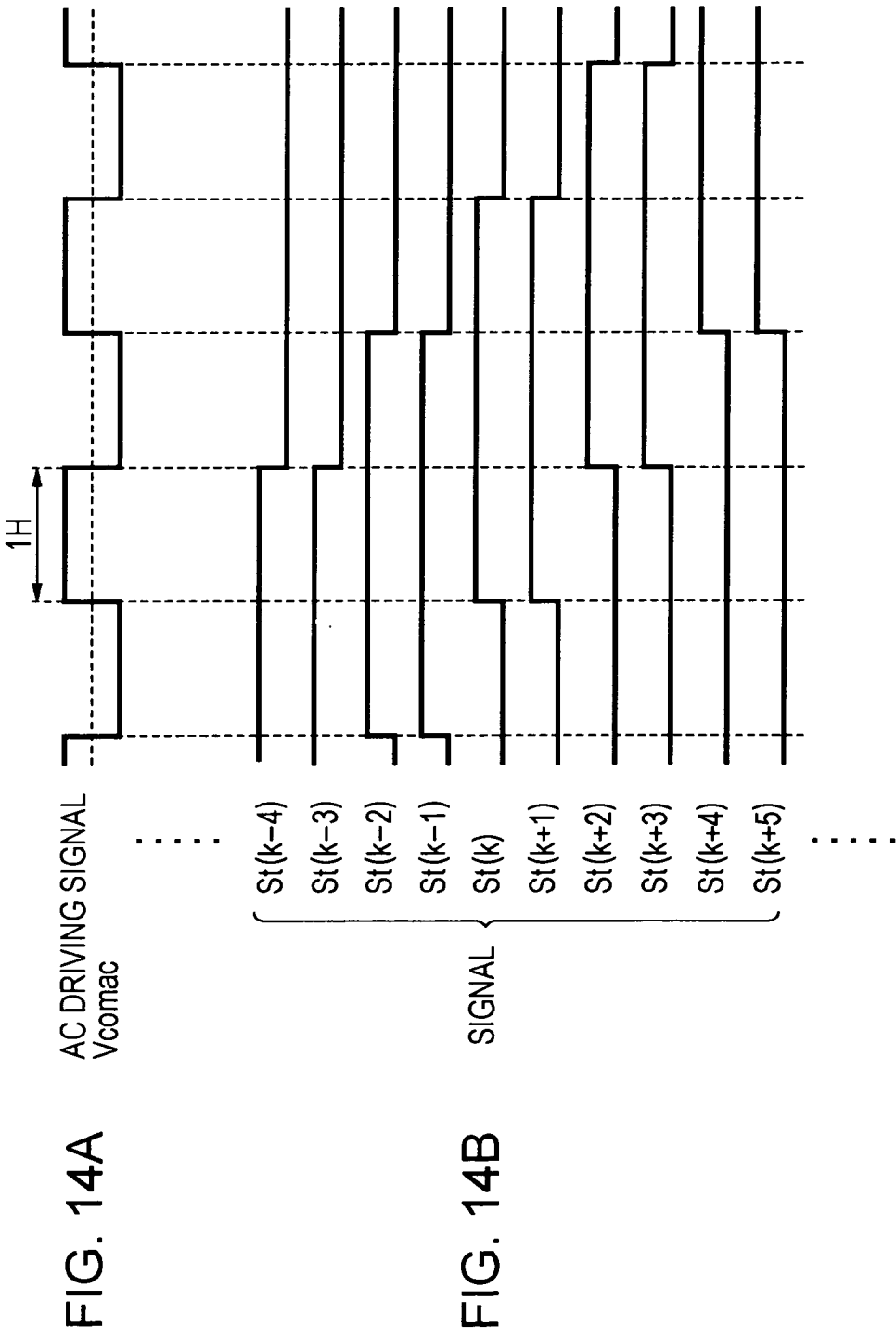

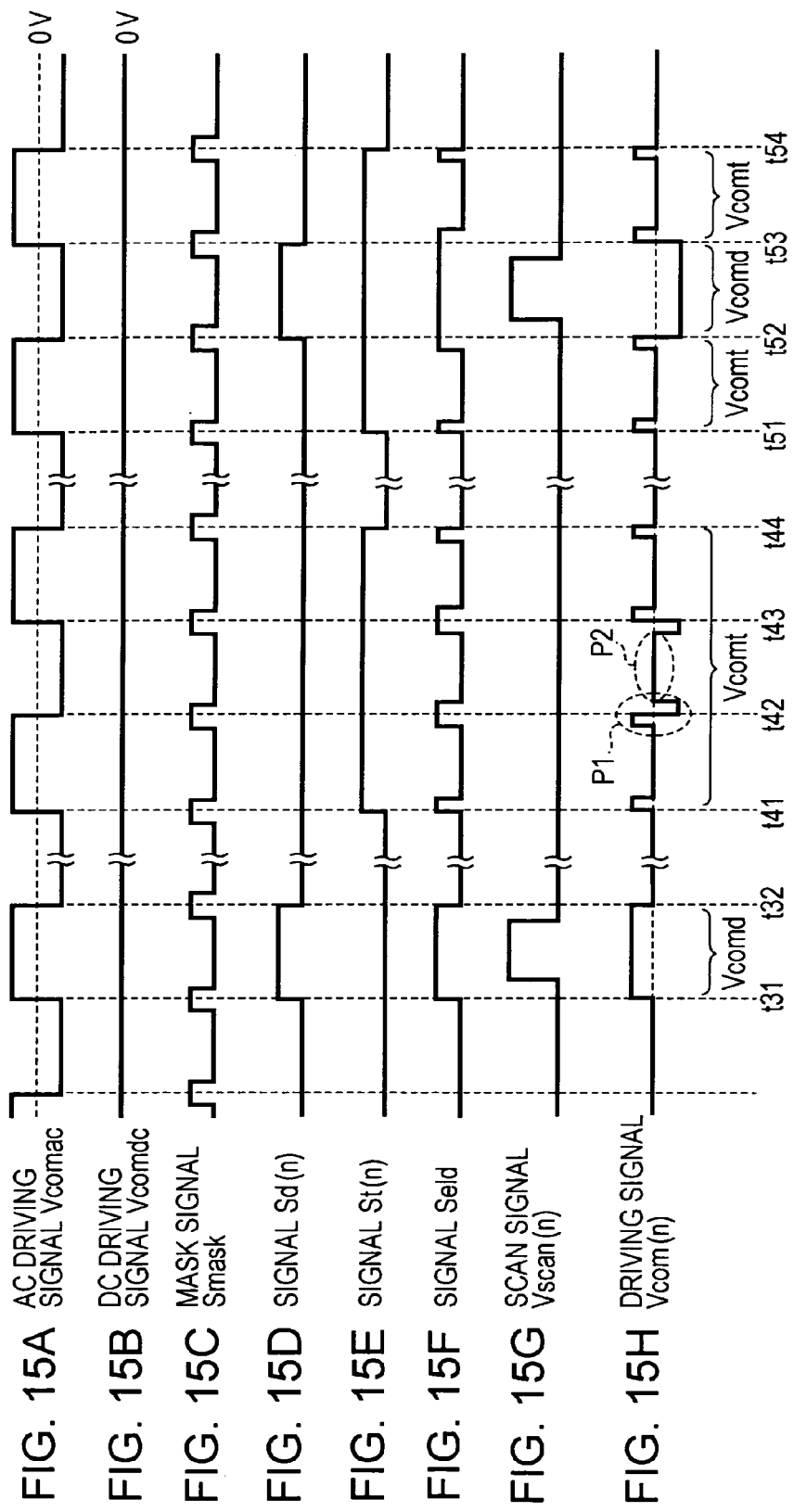

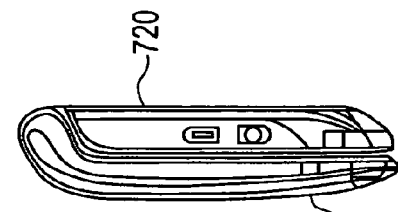
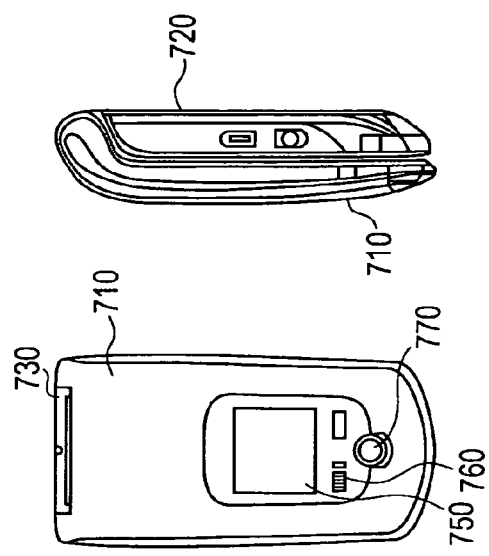
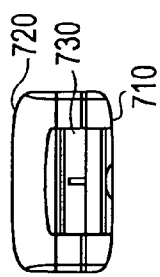
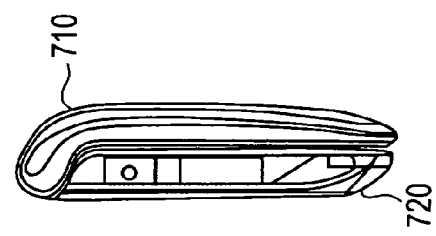
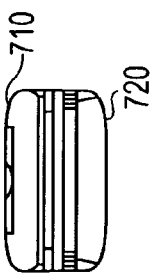
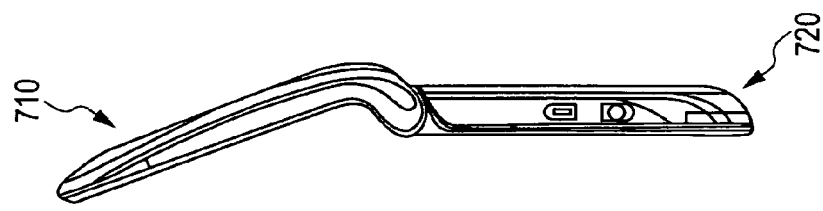
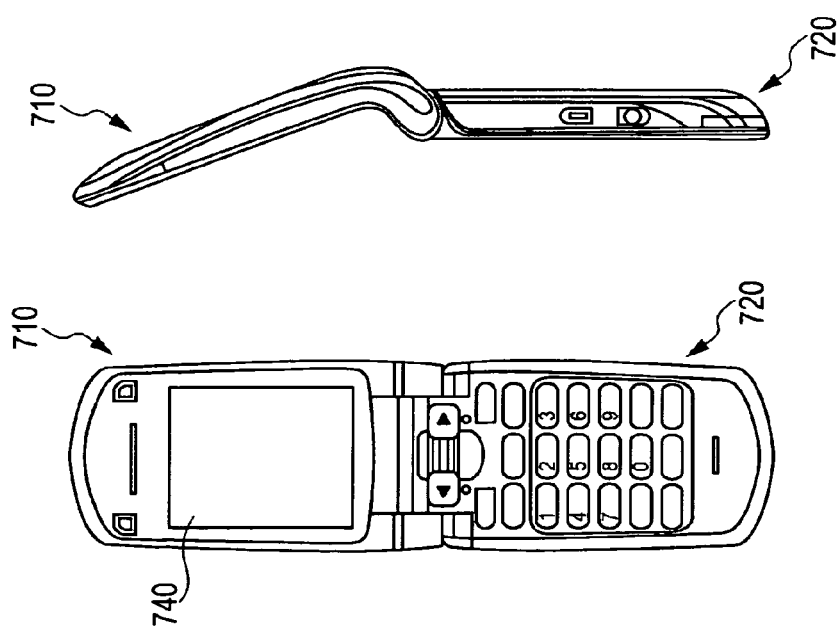

TOUCH DETECTION FUNCTION-ATTACHED DISPLAY APPARATUS, DRIVING METHOD AND DRIVING CIRCUIT THEREFOR WITH SWITCHABLE AC AND DC DRIVING, AND ELECTRONIC APPARATUS

BACKGROUND

The present disclosure relates a display apparatus capable of detecting an externally approaching object, and more particularly, to a touch detection function-attached display apparatus for detecting touch based on a change in electrostatic capacitance, a driving method and a driving circuit therefor, and an electronic apparatus having the display apparatus.

Recently, much attention has been paid to a display apparatus such as a liquid crystal display apparatus to which a touch detection function for detecting an externally approaching object such as a finger is provided and on which various button images or the like are displayed so as to be enabled to perform information input as a substitute for typical mechanical type buttons. Since an input apparatus such as a keyboard, a mouse, and a keypad is unnecessary for the display apparatus having such a touch detection function, there is a trend that the use of the display apparatus in portable information terminals such as mobile phones in addition to computers has increased.

There are several touch detection types. One of them is an electrostatic capacitance type. For example, Japanese Unexamined Patent Application Publication No. 2009-258182 discloses a display apparatus where a common electrode for display which is originally provided to the display apparatus, is also used as the one electrode of a pair of electrodes for a touch sensor and the other electrode (touch detection electrode) is disposed to intersect the common electrode. An electrostatic capacitance is formed between the common electrode and the touch detection electrode, so that the electrostatic capacitance is changed in response to an externally approaching object. By using this, the display apparatus detects the externally approaching object by analyzing a touch detection signal which appears at the touch detection electrode when a driving signal for touch detection is applied to the common electrode. In the display apparatus, line sequential scan is performed by sequentially applying the driving signal to the common electrode, so that a display operation is performed; and the touch detection signal which appears at the touch detection electrode according to the driving signal is analyzed, so that a touch detection operation is performed.

SUMMARY

However, in addition to the case where the driving signal for display operation (display driving signal) and the driving signal for touch detection operation (touch detection driving signal) are typically together applied to the same common electrode, the case where different signals are applied to different common electrodes may be considered. In this manner, in the case where different signals are used, the display operation and the touch detection operation may be performed asynchronously, so that the display operation and the touch detection operation may be independently performed. Therefore, it is possible to increase the degree of freedom of operation. More specifically, for example, by allowing the scan period of the touch detection operation to be shorter than the scan period of the display operation, so-called overtaking scan is available. However, in the overtaking scan, since the horizontal line, which the pixel signal is applied to, traverses the area of the common electrode which the touch detection driving signal is applied to, the display of the horizontal line may be disturbed.

It is desirable to provide a touch detection function-attached display apparatus capable of reducing the disturbance of display when overtaking scan is performed, a driving circuit and a driving method therefor, and an electronic apparatus.

According to the present disclosure, there is provided a touch detection function-attached display apparatus including a plurality of common driving electrodes, a display device, a touch detection device, and a scan driving unit. The plurality of the common driving electrodes are disposed in parallel so as to extend in one direction. The display device performs display based on a pixel signal and a display driving signal. The touch detection device detects an externally approaching object based on a touch detection driving signal. The scan driving unit performs a first scan driving in which the display driving signal is sequentially applied to the plurality of the common driving electrodes in a time division manner, performs a second scan driving in which the touch detection driving signal is sequentially applied to the plurality of the common driving electrodes in a time division manner at a scan speed different from that of the first scan driving, and applies a DC potential to the common driving electrodes which are not selected as an object of the first scan driving and the second scan driving. The touch detection driving signal includes a DC portion which is sustained at the DC potential in a time interval where the pixel signal is applied to the display device and a pulse portion in a time interval other than the pixel signal application time interval.

According to the present disclosure, there is provided a driving circuit including a scan driving unit. The scan driving unit is configured so that, with respect to a touch detection function-attached display unit having a plurality of common driving electrodes which are disposed in parallel so as to extend in one direction, a display device which performs display based on a pixel signal and a display driving signal, and a touch detection device which detects an externally approaching object based on a touch detection driving signal, the scan driving unit performs a first scan driving in which the display driving signal is sequentially applied to the plurality of the common driving electrodes in a time division manner and a second scan driving in which the touch detection driving signal is sequentially applied to the plurality of the common driving electrodes in a time division manner at a scan speed different from that of the first scan driving and applies a DC potential to the common driving electrodes which are not selected as an object of the first scan driving and the second scan driving. The touch detection driving signal includes a DC portion which is sustained at the DC potential in a time interval where the pixel signal is applied to the display device and a pulse portion in a time interval other than the pixel signal application time interval.

According to the present disclosure, there is provided a driving method for a touch detection function-attached display apparatus, including: performing a first scan driving operation in which display based on a pixel signal and a display driving signal is performed by sequentially applying the display driving signal to a plurality of common driving electrodes, which are disposed in parallel so as to extend in one direction, in a time division manner and by sequentially performing an operation for applying the pixel signal to pixel electrodes corresponding to the common driving electrodes, which are under the application of the display driving signal, in synchronization with the application of the display driving signal, in a time division manner; performing a second scan driving operation in which a touch detection driving signal for detection of the externally approaching object, which has a DC waveform unit corresponding to the pixel signal application time interval and a pulse waveform unit corresponding to the pixel signal non-application time interval, is sequentially applied to the plurality of the common driving electrodes in a time division manner at a scan speed different from that of the first scan driving operation; and applying a potential of a DC waveform unit of the touch detection driving signal to the common driving electrodes which are not selected as an object of the first and the second scan driving operations.

According to the present disclosure, there is provided an electronic apparatus having the aforementioned touch detection function-attached display apparatus. For example, a television apparatus, a digital camera, a personal computer, a video camera, a portable terminal apparatus such as a mobile phone, or the like corresponds to the touch detection function-attached display apparatus.

In the touch detection function-attached display apparatus, the driving circuit, the driving method, and the electronic apparatus according to the disclosure, first scan driving for display scan and the second scan driving for touch detection scan are performed. The touch detection driving signal which is applied to the common driving electrode in the second scan driving includes a DC portion having a DC potential applied to the common driving electrodes which are not selected as an object of the first scan driving and the second scan driving in the pixel signal application time interval. Accordingly, the same DC potential is typically applied to a driving electrode adjacent to the driving electrode which is an object of the first scan driving, irrespective of whether or not the state is the overtaken state, in the pixel signal application time interval.

In the touch detection function-attached display apparatus according to the present disclosure, it is preferable that, for example, the scan driving unit include a first switch which transfers an AC signal; in the first scan driving, by turning on the first switch, the AC signal be applied as the display driving signal to the common driving electrode; and in the second scan driving, by turning on the first switch in the time interval other than the pixel signal application time interval, the pulse portion of the touch detection driving signal be generated and applied to the common driving electrode. In addition, it is preferable that for example, the scan driving unit further include a second switch which transfers the DC potential; and by turning on the second switch in the pixel signal application time interval, the DC portion of the touch detection driving signal be generated and applied to the common driving electrode. It is preferable that for example, the scan driving unit apply the DC potential to the common driving electrode by turning on the second switch.

It is preferable that the touch detection device detect an externally approaching object, for example, by using a change in electrostatic capacitance based on approach or contact of the externally approaching object. It is preferable that, for example, the display driving signal be a rectangular wave signal. In this case, it is preferable that the DC potential be equal to, for example, a time average of voltage of the display driving signal. It is preferable that the scan driving unit generate the touch detection driving signal, for example, based on a mask signal including pulses spanning before and after the transition of the display driving signal.

In the touch detection function-attached display apparatus, the driving method and the driving circuit therefore, and the electronic apparatus according to the present disclosure, the touch detection driving signal including the DC portion having the DC potential which is applied to the common driving electrodes which are not selected as an object of the scan driving in the pixel signal application time interval is configured to be used, so that it is possible to reduce the disturbance of display when the overtaking scan is performed.

BRIEF DESCRIPTION OF THE DRAWINGS

FIGS. 2A and 2B are diagrams illustrating a basic principle of a touch detection type of a touch detection function-attached display apparatus according to the present disclosure and a state where a finger contacts or approaches the touch detection function-attached display apparatus.

FIGS. 3A and 3B are diagrams illustrating a basic principle of a touch detection type of a touch detection function-attached display apparatus according to the present disclosure and an example of waveforms of a driving signal and a touch detection signal.

FIGS. 10A to 10F are timing waveform diagrams illustrating an example of input and output waveforms relating to the scan driving unit illustrated in FIG. 8.

FIGS. 11A to 11C are schematic diagram illustrating an example of operations of the scan driving unit illustrated in FIG. 8.

FIGS. 13A and 13B are timing waveform diagrams illustrating an example of operations of a display scan unit illustrated in FIG. 8.

FIGS. 14A and 14B are timing waveform diagrams illustrating an example of operations of a touch detection scan unit illustrated in FIG. 8.

FIGS. 15A to 15H are timing waveform diagrams illustrating an example of operations of a driving unit illustrated in FIG. 8.

FIGS. 24A to 24G are front, side, top, and bottom views illustrating a configuration of outer appearance of Application Example 5.

DETAILED DESCRIPTION OF EMBODIMENTS

Hereinafter, embodiments of the present disclosure will be described in detail with reference to the accompanying drawings. In addition, the description will be made in the following order.

1. Basic Principle of Electrostatic Capacitance Type Touch Detection
2. Embodiment
3. Application Example 1. Basic Principle of Electrostatic Capacitance Type Touch Detection First, a basic principle of touch detection of a touch detection function-attached display apparatus according to the present disclosure is described with reference to FIGS. 1A to 3B. The touch detection type is embodied by using an electrostatic capacitance type touch sensor. For example, as illustrated in FIG. 1A, a capacitance device is configured by using a pair of electrodes (driving electrode E1 and touch detection electrode E2) which are disposed to face each other with a dielectric material D interposed therebetween. The structure is illustrated as an equivalent circuit illustrated in FIG. 1B. The capacitance device C1 is configured with the driving electrode E1, the touch detection electrode E2, and the dielectric material D. The one end of the capacitance device C1 is connected to an AC signal source (driving signal source) S, and the other end P thereof is grounded through a resistor R and connected to a voltage detector (touch detection unit) DET. If an AC rectangular wave Sg (FIG. 3B) having a predetermined frequency (for example, from about several kHz to about several ten kHz) is applied from an AC signal source S to the driving electrode E1 (the one end of the capacitance device C1), an output waveform (touch detection signal Vdet) as illustrated in FIG. 3A appears at the touch detection electrode E2 (the other end P of the capacitance device C1). In addition, the AC rectangular wave Sg corresponds to the later-described touch detection driving signal Vcomt.

Figure 1B:
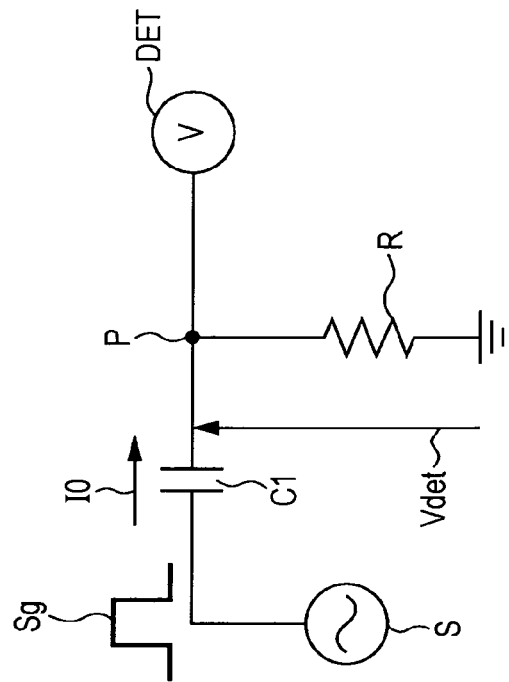
FIGS. 1A and 1B are diagrams illustrating a basic principle of a touch detection type of a touch detection function-attached display apparatus according to the present disclosure and a state where a finger neither contacts nor approaches the touch detection function-attached display apparatus.
Figure 1A:
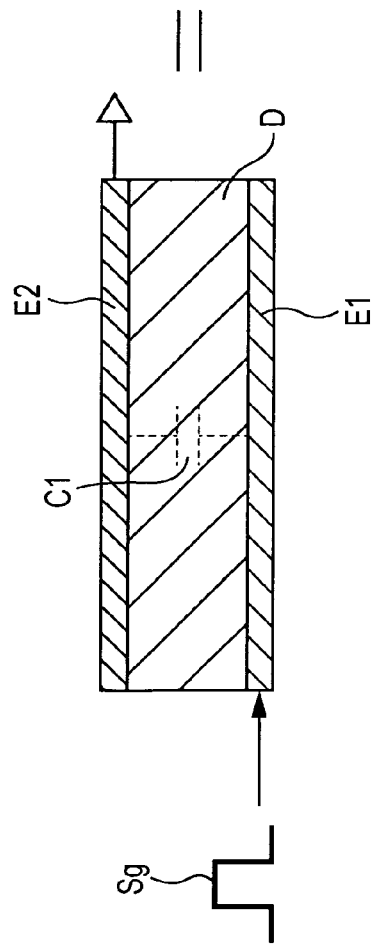
Figure 4:
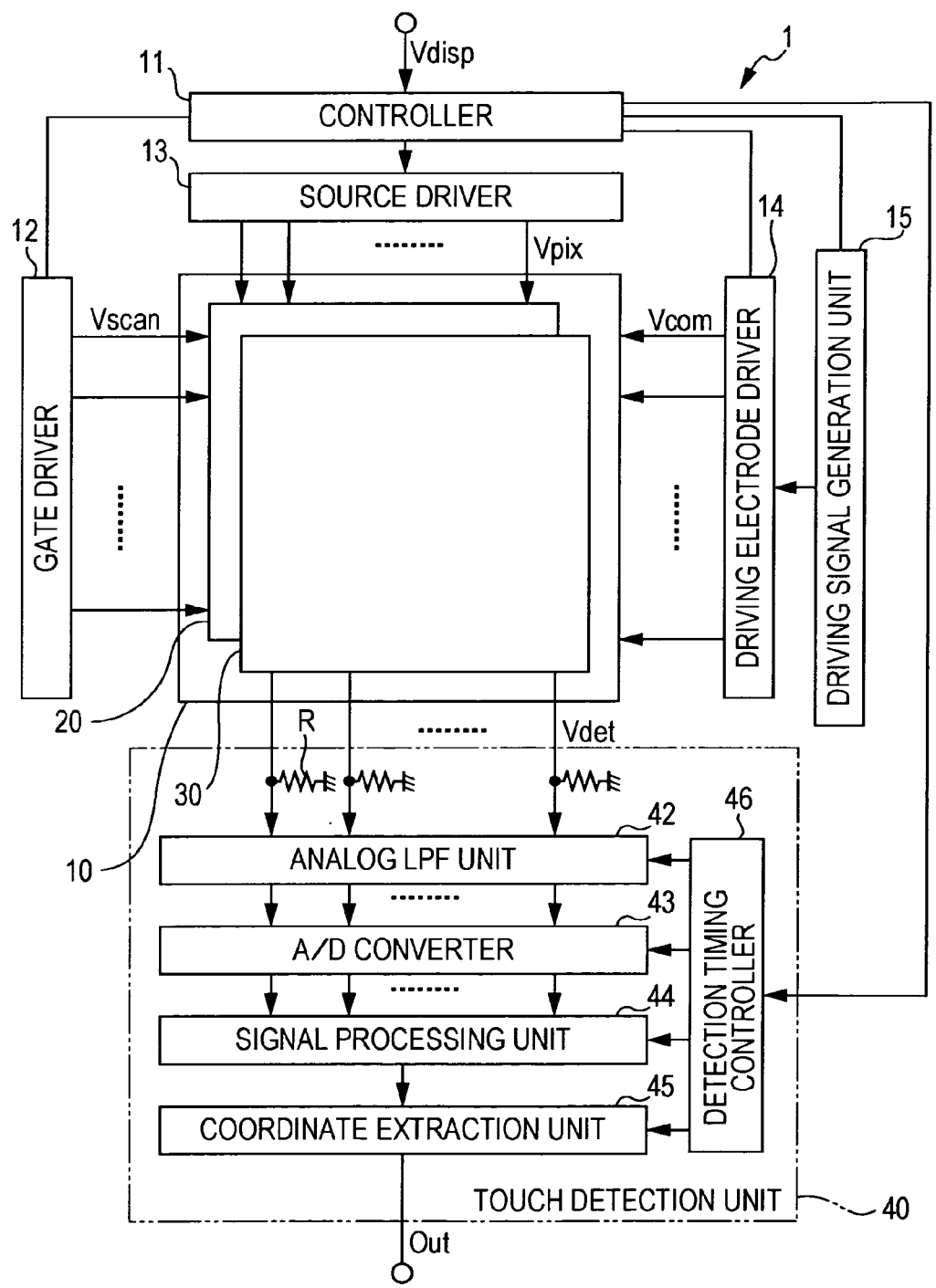
FIG. 4 is a block diagram illustrating an example of a configuration of a touch detection function-attached display apparatus according to an embodiment of the present disclosure.

In the state where a finger does not contact (or approach) the touch detection function-attached display apparatus, as illustrated in FIGS. 1A and 1B, during the charging and discharging of the capacitance device C1, a current I0 flows according to a capacitance value of the capacitance device C1. At this time, the potential waveform at the other end P of the capacitance device C1 becomes, for example, a waveform V0 in FIG. 3A, and the waveform V0 is detected by the voltage detector DET.

On the other hand, in the state where a finger contacts (or approaches) the touch detection function-attached display apparatus, as illustrated in FIGS. 2A and 2B, a capacitance device C2 formed by the finger is serially added to the capacitance device C1. In this state, during the charging and discharging of the capacitance devices C1 and C2, currents I1 and I2 flow respectively. At this time, the potential waveform at the other end P of the capacitance device C1 becomes, for example, a waveform V1 in FIG. 3A, and the waveform V1 is detected by the voltage detector DET. At this time, the potential at the point P becomes a partial potential defined by the values of the currents I1 and I2 flowing in the capacitance devices C1 and C2. Therefore, the waveform V1 has a value smaller than that of the waveform V0 in the non-contact state. The voltage detector DET compares the detected voltage with a predetermined threshold value voltage Vth. If the detected voltage is equal to or higher than the threshold value voltage, the non-contact state is determined. If the detected voltage is lower than the threshold value voltage, the contact state is determined. In this manner, the touch detection may be performed.

2. First Embodiment

Example of Configuration (Example of Overall Configuration)

FIGS. 1A and 1B are diagrams illustrating an example of a configuration of a touch detection function-attached display apparatus according to a first embodiment of the present disclosure. In addition, since a driving circuit and a driving method of the touch detection function-attached display apparatus according to the embodiment of the present disclosure are embodied by the embodiment, the driving circuit and the driving method are also described. The touch detection function-attached display apparatus uses a liquid crystal display device as a display device, so that the touch detection function-attached display apparatus is an in-cell type apparatus where a liquid crystal display device configured with the liquid crystal display module and an electrostatic capacitance type touch detection module are integrated.

The touch detection function-attached display apparatus 1 includes a controller 11, a gate driver 12, a source driver 13, a driving signal generation unit 15, a driving electrode driver 14, a touch detection function-attached display module 10, and a touch detection unit 40.

The controller 11 supplies control signals to the gate driver 12, the source driver 13, the driving signal generation unit 15, the driving electrode driver 14, and the touch detection unit 40 based on a video signal Vdisp, which is externally supplied, so that the gate driver 12, the source driver 13, the driving signal generation unit 15, the driving electrode driver 14, and the touch detection unit 40 are controlled to operate in synchronization with each other.

The gate driver 12 has a function of sequentially selecting one horizontal line, which becomes an object of display driving of the touch detection function-attached display module 10, based on the control signal supplied from the controller 11. More specifically, as described later, the gate driver 12 applies a scan signal Vscan through a scan signal line GCL to the gate of a TFT device Tr of a pixel Pix, so that one row (one horizontal line) of the pixels Pix which are formed in a matrix shape in a liquid crystal display module 20 of the touch detection function-attached display module 10 is sequentially selected as the object of the display driving.

The source driver 13 supplies a pixel signal Vpix to each of the pixels Pix (described later) of the touch detection function-attached display module 10 based on the control signal supplied from the controller 11. More specifically, as described later, the source driver 13 supplies the pixel signal Vpix through a pixel signal line SGL to each of the pixels Pix which constitute one horizontal line sequentially selected by the gate driver 12.

The driving signal generation unit 15 generates an AC driving signal Vcomac having an AC rectangular waveform and a DC driving signal Vcomdc and supplies the AC driving signal Vcomac and the DC driving signal Vcomdc to the driving electrode driver 14 which is described later based on the control signal supplied from the controller 11.

The driving electrode driver 14 supplies a driving signal Vcom to a driving electrode COML (described later) of the touch detection function-attached display module 10 based on the control signal supplied from the controller 11. More specifically, the driving electrode driver 14 sequentially applies the AC driving signal Vcomac, which is supplied from the driving signal generation unit 15, as a display driving signal Vcomd to the driving electrode COML, which becomes an object of a display operation, in a time division manner. In addition, the driving electrode driver 14 has a function of generating a touch detection driving signal Vcomt (described later) and sequentially applying the touch detection driving signal Vcomt to the driving electrode COML, which becomes an object of a touch detection operation, in a time division manner based on the AC driving signal Vcomac and the DC driving signal Vcomdc which are supplied from the driving signal generation unit 15.

The gate driver 13 and the driving electrode driver 14 constitute a scan driving unit 50. A configuration of the scan driving unit 50 is described later in detail.

The touch detection function-attached display module 10 is a display module having a touch detection function built in. The touch detection function-attached display module 10 includes a liquid crystal display module 20 and a touch detection module 30. The liquid crystal display module 20 is a device which performs sequential scan in units of one horizontal line and performs display according to the scan signal Vscan supplied from the gate driver 12 and the display driving signal Vcomd supplied from the driving electrode driver 14. The touch detection module 30 operates based on the aforementioned basic principle of the electrostatic capacitance type touch detection and outputs a touch detection signal Vdet based on the touch detection driving signal Vcomt supplied from the driving electrode driver 14.

The touch detection unit 40 is a circuit of detecting existence of the touch on the touch detection module 30 based on the control signal supplied from the controller 11 and the touch detection signal Vdet supplied from the touch detection module 30 of the touch detection function-attached display module 10 and obtaining a coordinate or the like of a touch-detected area in the case where the touch exists. The touch detection unit 40 includes an analog LPF (Low Pass Filter) unit 42, an A/D converter 43, a signal processing unit 44, a coordinate extraction unit 45, and a detection timing controller 46. The analog LPF unit 42 is a low pass analog filter which removes a high frequency component (noise component) included in the touch detection signal Vdet supplied from the touch detection module 30 to extract touch components and outputs the touch components. Resistors R for applying a DC potential (0V) are connected between input terminals of the analog LPF unit 42 and the ground. In addition, instead of the resistor R, for example, a switch may be provided, so that the DC potential (0V) may be applied by turning on the switch at a predetermined time. The A/D converter 43 is a circuit which converts analog signals output from the analog LPF unit 42 into digital signals. The signal processing unit 44 is a logic circuit which detects the existence of touch on the touch detection module 30 based on an output signal of the A/D converter 43. The coordinate extraction unit 45 is a logic circuit which obtains the touch panel coordinate when the touch is detected in the signal processing unit 44. The detection timing controller 46 controls these circuits to be operated in synchronization with each other.

(Touch Detection Function-Attached Display Module 10)

Next, an example of a configuration the touch detection function-attached display module 10 is described in detail.

Figure 5:
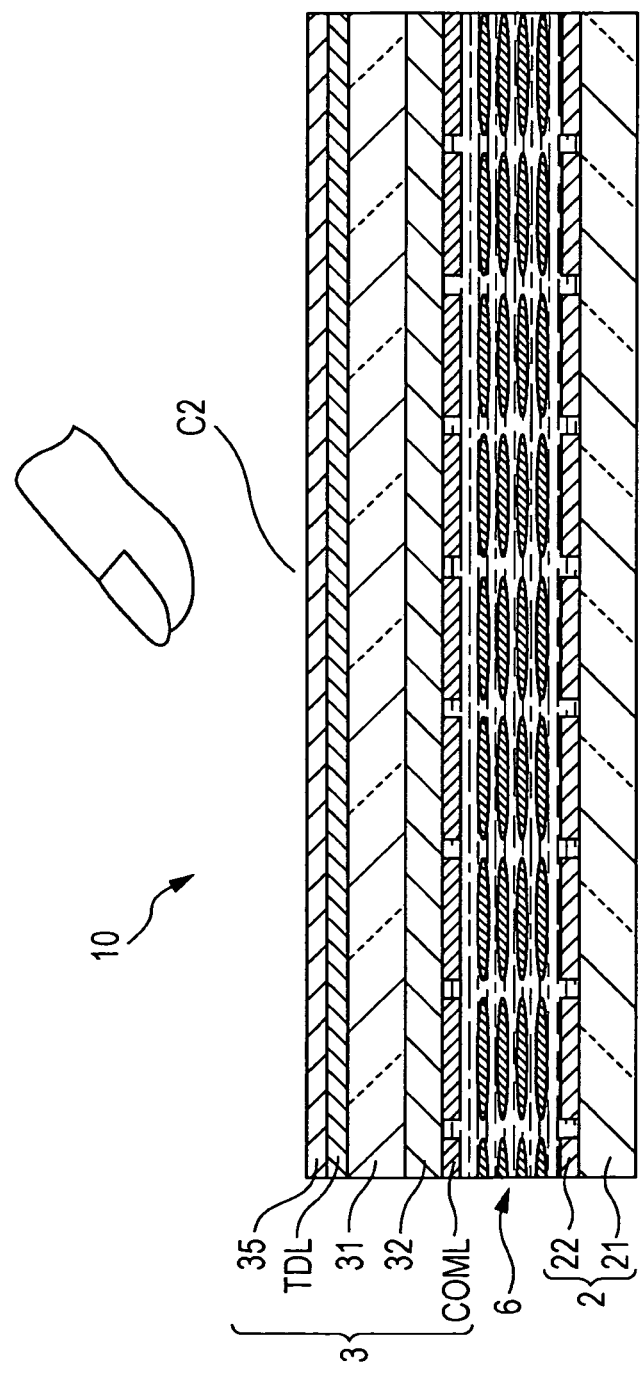
FIG. 5 is a cross-sectional diagram illustrating a schematic cross-sectional structure of a touch detection function-attached display module illustrated in FIG. 4.

FIG. 5 illustrates an example of a cross-sectional structure of main portions of the touch detection function-attached display module 10. The touch detection function-attached display module 10 includes a pixel substrate 2, an opposite substrate 3 which is disposed to face the pixel substrate 2, and a liquid crystal layer 6 which is interposed between the pixel substrate 2 and the opposite substrate 3.

The pixel substrate 2 includes a TFT substrate 21 as a circuit substrate and a plurality of pixel electrodes 22 which are disposed in a matrix shape on the TFT substrate 21. Although not shown, thin film transistors (TFTs) of the pixels and wire lines such as pixel signal lines SGL for supplying the image signals Vpix to the pixel electrodes 22 and scan signal lines GCL for driving the TFTs are formed on the TFT substrate 21.

The opposite substrate 3 includes a glass substrate 31, a color filter 32 which is formed on the one surface of the glass substrate 31, and a plurality of driving electrodes COML which are formed on the color filter 32. The color filter 32 is configured by periodically arraying color filter layers of three colors, for example, red (R), green (G), and blue (B), so that one set of the three colors of R, G, and B may correspond to each display pixel. The driving electrode COML functions as a common driving electrode of the liquid crystal display module 20 and also functions as a driving electrode of the touch detection module 30. The driving electrode COML is connected to the pixel substrate 2 by a contact conductive pillar (not shown), so that the driving signals Vcom having an AC rectangular waveform (display driving signal Vcomd and touch detection driving signal Vcomt) are applied through the contact conductive pillar from the pixel substrate 2 to the driving electrode COML. A touch detection electrode TDL which is a detection electrode of the touch detection module 30 is formed on the other surface of the glass substrate 31, and a polarizing plate 35 is disposed on the touch detection electrode TDL.

The liquid crystal layer 6 modulates light passing through the liquid crystal layer 6 according to the state of an electric field. For example, liquid crystals in various modes such as TN (Twisted Nematic), VA (Vertically Aligned), and ECB (Electrically Controlled Birefringence) modes may be used.

In addition, alignment films are disposed between the liquid crystal layer 6 and the pixel substrate 2 and between the liquid crystal layer 6 and the opposite substrate 3, and an incidence-side polarizing plate is disposed on the lower surface of the pixel substrate 2. However, herein, these components are omitted in illustration.

Figure 6:
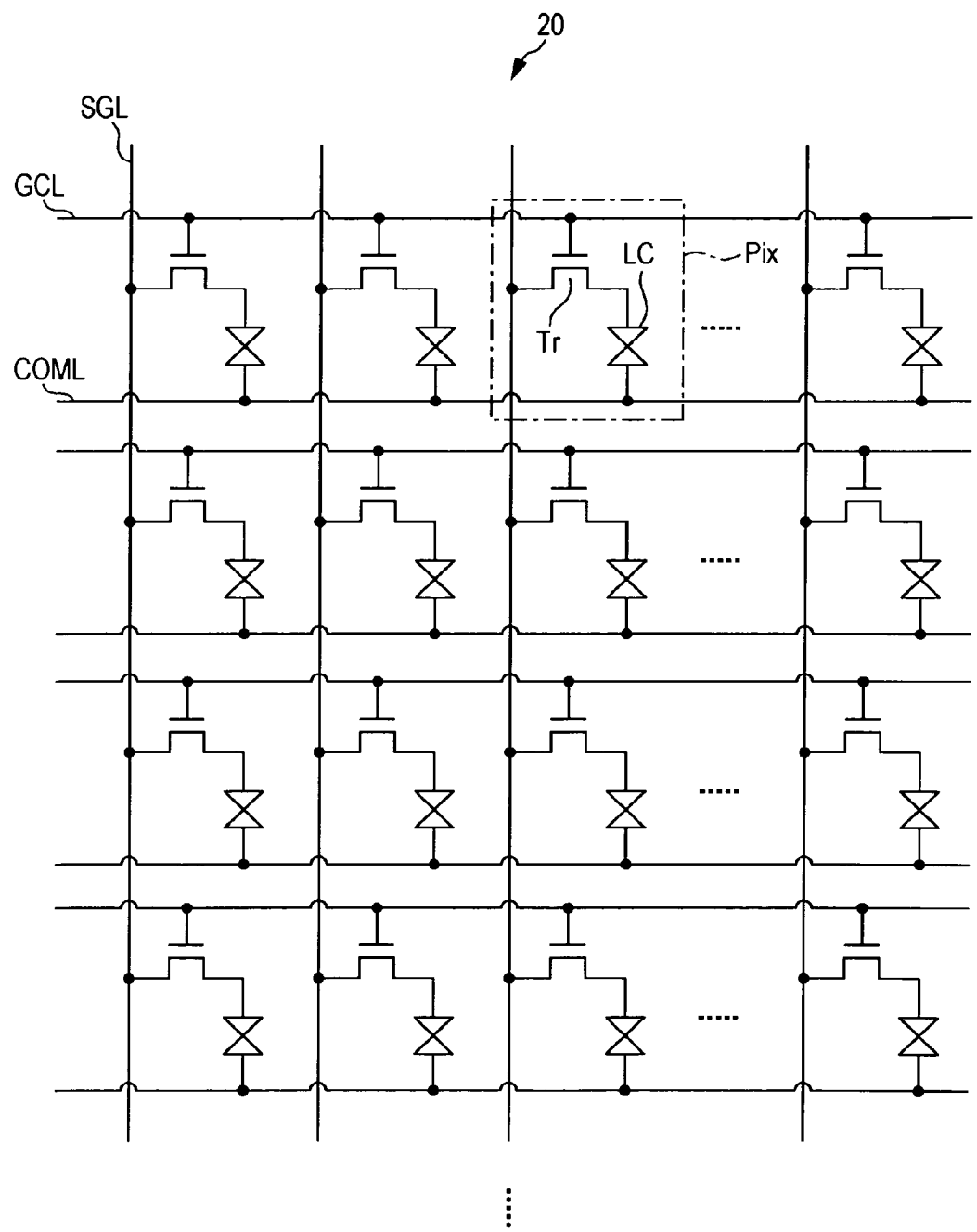
FIG. 6 is a circuit diagram illustrating a pixel array of the touch detection function-attached display module illustrated in FIG. 4.

FIG. 6 illustrates an example of a configuration of a pixel structure of the liquid crystal display module 20. The liquid crystal display module 20 includes a plurality of the pixels Pix which are disposed in a matrix shape. Each pixel Pix includes a TFT device Tr and a liquid crystal device LC. The TFT device Tr is configured with a thin film transistor. In this example, the TFT device Tr is configured with an n-channel MOS (Metal Oxide Semiconductor) type TFT. The source of the TFT device Tr is connected to the pixel signal line SGL; the gate thereof is connected to the scan signal line GCL; and the drain thereof is connected to the one end of the liquid crystal device LC. The one end of the liquid crystal device LC is connected to the drain of the TFT device Tr, and the other end thereof is connected to the driving electrode COML.

The pixel Pix and the other pixels Pix included in the same row of the liquid crystal display module 20 are connected to each other by the scan signal line GCL. The scan signal line GCL is connected to the gate driver 12, so that the scan signal Vscan is supplied from the gate driver 12 thereto. The pixel Pix and the other pixels Pix included in the same column of the liquid crystal display module 20 are connected to each other by the pixel signal line SGL. The pixel signal line SGL is connected to the source driver 13, so that the pixel signal Vpix is supplied from the source driver 13 thereto.

In addition, the pixel Pix and the other pixels Pix included in the same row of the liquid crystal display module 20 are connected to each other by the driving electrode COML. The driving electrode COML is connected to the driving electrode driver 14, so that the driving signal Vcom is supplied from the driving electrode driver 14 thereto.

According to the configuration, in the liquid crystal display module 20, the gate driver 12 drives the scan signal line GCL to be line-sequentially scanned in a time division manner, so that one horizontal line is sequentially selected; and the source driver 13 supplies the pixel signal Vpix to the pixels Pix included in the one horizontal line, so that display in units of one horizontal line is performed. When the display operation is performed, the driving electrode driver 14 applies the display driving signal Vcomd to the driving electrode COML corresponding to the one horizontal line.

Figure 7:
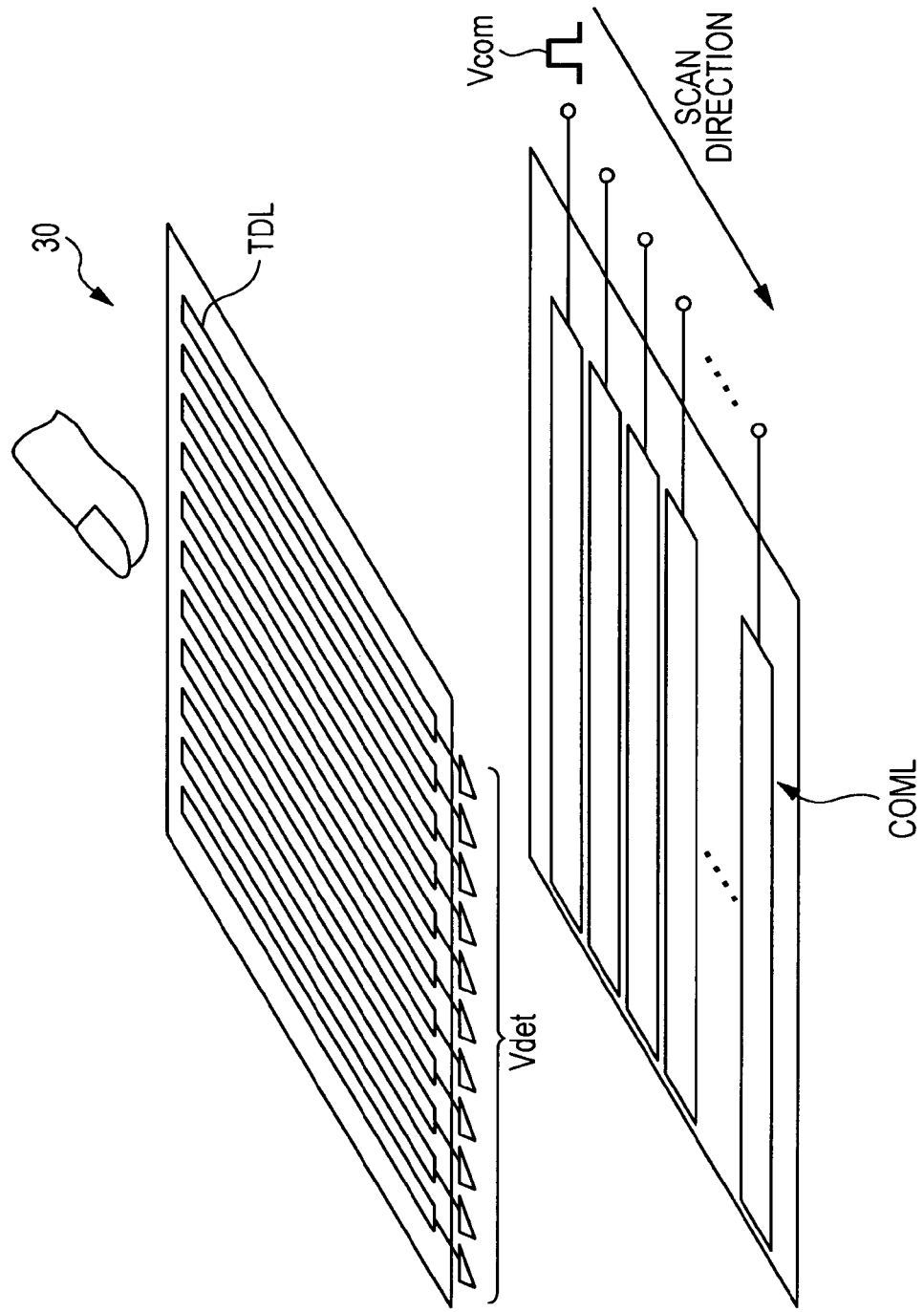
FIG. 7 is a perspective view illustrating an example of a configuration of a driving electrode and a touch detection electrode of the touch detection function-attached display module illustrated in FIG. 4.

FIG. 7 is a perspective view illustrating an example of a configuration of the touch detection module 30. The touch detection module 30 is configured with the driving electrode COML and the touch detection electrode TDL which are disposed on the opposite substrate 3. The driving electrode COML is divided into a plurality of stripe-shaped electrode patterns which are disposed to extend in the left and right directions of the figure. When the touch detection operation is performed, the touch detection driving signal Vcomt is sequentially supplied to each of the electrode patterns by the driving electrode driver 14, so that the scan driving is performed. The touch detection electrode TDL is configured with stripe-shaped electrode patterns which are disposed to extend in the direction perpendicular to the extension direction of the electrode patterns of the driving electrode COML. Each electrode pattern of the touch detection electrode TDL is connected to the input of the analog LPF unit 42 of the touch detection unit 40. By the intersecting electrode patterns of the driving electrode COML and the touch detection electrode TDL, an electrostatic capacitance is formed at each of the intersecting portions.

According to the configuration, in the touch detection module 30, during the performing of the touch detection operation, the driving electrode driver 14 drives the driving electrode COML to be sequentially scanned in a time division manner so as to output the touch detection signal Vdet from the touch detection electrode TDL, so that the touch detection is performed. In other words, the driving electrode COML corresponds to the driving electrode E1 in the basic principle of the touch detection illustrated in FIGS. 1A and 1B, 2A and 2B, and 3A and 3B, and the touch detection electrode TDL corresponds to the touch detection electrode E2. Accordingly, the touch detection module 30 detects touch according to the basic principle. As illustrated in FIG. 7, the intersecting electrode patterns constitute an electrostatic capacitance type touch sensor in a matrix shape. Therefore, by scanning the entire touch detection surface of the touch detection module 30, the positions where the contact or approach of an externally approaching object may also be detected.

(Scan Driving Unit 50)

Next, an example of a configuration of the scan driving unit 50, which is configured with the gate driver 12 and the driving electrode driver 14, is described in detail.

Figure 8:
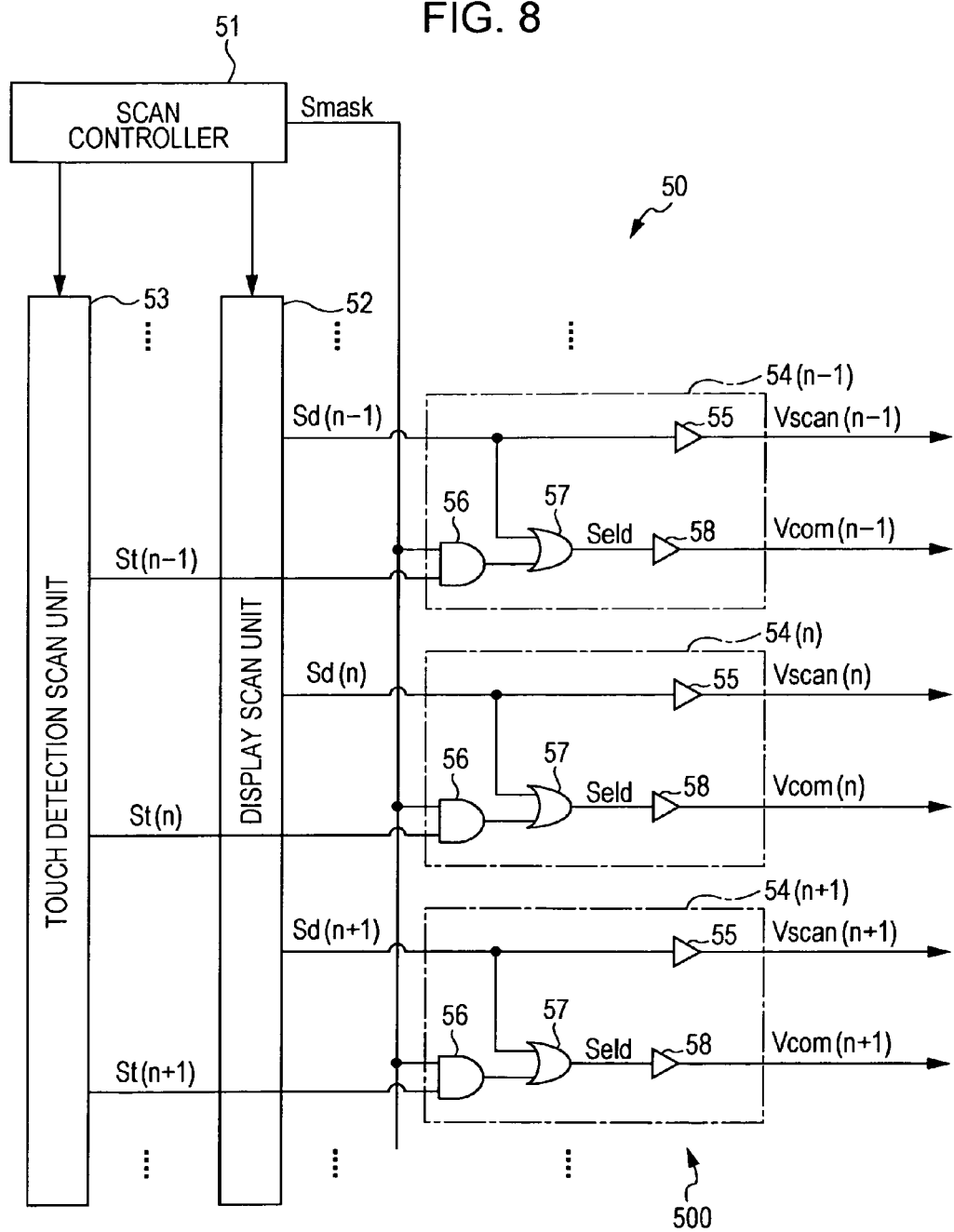
FIG. 8 is a block diagram illustrating an example of a configuration of a scan driving unit according to an embodiment of the present disclosure.

FIG. 8 illustrates one example of a configuration of the scan driving unit 50. The scan driving unit 50 includes a scan controller 51, a display scan unit 52, a touch detection scan unit 53, and a driving unit 540. The display scan unit 52, the scan controller 51, and a portion of the driving unit 540 constitute the gate driver 12. In addition, the touch detection scan unit 53, the scan controller 51, and a portion of the driving unit 540 constitute the driving electrode driver 14. The driving unit 540 is configured with N driving units 54(1) to 54(N). Hereinafter, in the case where an arbitrary one of the N driving units 54(1) to 54(N) is indicated, only the driving unit 54 is considered to be used.

The scan controller 51 supplies control signals to the display scan unit 52 and the touch detection scan unit 53 based on the control signal (not shown) supplied from the controller 11 and supplies the mask signal Smask to the driving unit 540.

The display scan unit 52 is configured to include shift registers and generates signals Sd for selecting the scan signal line GCL for sequentially applying the scan signal Vscan. In addition, the signals Sd are also used to select the driving electrode COML to which the display driving signal Vcomd is sequentially applied. More specifically, as described later, the display scan unit 52 generates a plurality of the signals Sd corresponding to the scan signal lines GCL based on the control signal supplied from the scan controller 51. When the display scan unit 52 supplies a high level signal as the n-th signal Sd(n) to the n-th driving unit 54(n), the driving unit 54(n) applies the scan signal Vscan(n) to the scan signal line GCL of the n-th row and applies the display driving signal Vcomd to the driving electrode COML(n) of the n-th row. In other words, the display scan unit 52 instructs the driving unit 540 to perform the display driving by outputting the high level signal Sd.

The touch detection scan unit 53 is configured to include shift registers and generates signals St for selecting the driving electrode COML to which the touch detection driving signal Vcomt is sequentially applied. More specifically, as described later, the touch detection scan unit 53 generates a plurality of the signals St corresponding to the driving electrode COML based on the control signal supplied from the scan controller 51. When the touch detection scan unit 53 supplies a high level signal as the n-th signal St(n) to the n-th driving unit 54(n), the driving unit 54(n) applies the touch detection driving signal Vcomt to the driving electrode COML(n) of the n-th row. In other words, the touch detection scan unit 53 instructs the driving unit 540 to perform the touch detection driving by outputting the high level signal St.

The driving unit 540 applies the scan signal Vscan to the scan signal line GCL and applies the driving signal Vcom (the display driving signal Vcomd and the touch detection driving signal Vcomt) to the driving electrode COML based on the signal Sd supplied from the display scan unit 52 and the signal St supplied from the touch detection scan unit 53. At this time, the driving unit 540 also has a function of generating the touch detection driving signal Vcomt based on the mask signal Smask supplied from the scan driving unit 51. The driving units 54 are configured so that each of the driving units 54 is disposed corresponding to a set of the output signals of the display scan unit 51 and the touch detection scan unit 52 to apply the scan signal Vscan to the corresponding scan signal line GCL and to apply the driving signal Vcom to the corresponding driving electrode COML.

The driving unit 54 includes a gate buffer 55, a logic AND circuit 56, a logic OR circuit 57, and a driving switch circuit 58.

The gate buffer 55 is a circuit which applies the scan signal Vscan to the scan signal line GCL based on the signal Sd supplied from the display scan unit 52. More specifically, in this example, the gate buffer 55 has a function of amplifying the signal Sd up to the amplitude level capable of controlling on and off of the TFT device Tr of the liquid crystal display module 20 and changing a pulse width thereof into an appropriate pulse width as the scan signal Vscan.

The logic AND circuit 56 performs a logic AND (AND) operation of the mask signal Smask supplied from the scan controller 51 and the signal St supplied from the touch detection scan unit 52 and outputs a result of the logic AND operation.

The logic OR circuit 57 performs a logic OR (OR) operation of the signal Sd supplied from the display scan unit 53 and the output signal of the logic AND circuit 56 and outputs a result of the logic OR operation as a signal Seld.

The driving switch circuit 58 is circuit which applies the driving signal Vcom to the driving electrode COML based on the signal Seld supplied from the logic OR circuit 57.

Figure 9:
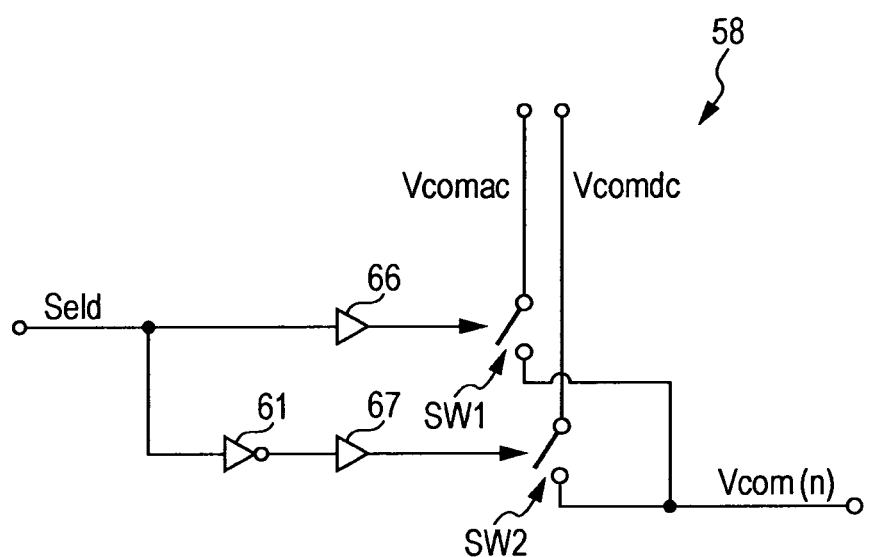
FIG. 9 is a circuit diagram illustrating an example of a driving signal buffer illustrated in FIG. 8.

FIG. 9 illustrates one example of a configuration of the driving switch circuit 58. The driving switch circuit 58 includes an inverter 61, buffers 66 and 67, and switches SW1 and SW2. The inverter 61 generates an inverted logic value of the signal Seld supplied from the logic OR circuit 57 and outputs the inverted logic value. The buffer 66 has a function of amplifying the input signal Seld up to the amplitude level capable of controlling on and off of the switch SW1. The switch SW1 is controlled to be turned on and off based on the signal supplied from the buffer 66. The AC driving signal Vcomac is supplied to the one end of the switch SW1, and the other end thereof is connected to an output terminal of the driving switch circuit 58. The buffer 67 has a function of amplifying the output signal of the inverter 61 up to the amplitude level capable of controlling on and off of the switch SW2. The switch SW2 is controlled to be turned on and off based on the signal supplied from the buffer 67. The DC driving signal Vcomdc is supplied to the one end of the switch SW2, and the other end thereof is connected to an output terminal of the driving switch circuit 58.

According to the configuration, in the case where the input signal Seld is in a high level, the driving switch circuit 58 outputs the AC driving signal Vcomac as the driving signal Vcom(n). In the case where the input signal Seld is in a low level, the driving switch circuit 58 outputs the DC driving signal Vcomdc as the driving signal Vcom(n).

FIGS. 10A to 10F illustrate timing waveform diagrams of signals associated with the driving unit 54($n$). FIG. 10A illustrates a waveform of the AC driving signal Vcomac. FIG. 10B illustrates a waveform of the DC driving signal Vcomdc. FIG. 10C illustrates a waveform of the mask signal Smask. FIGS. 10D to 10F illustrate examples of waveforms of the driving signals Vcom(n).

As illustrated in FIG. 10A, the AC driving signal Vcomac is a rectangular wave signal having an amplitude Vd. In the example illustrated in FIG. 10B, the DC driving signal Vcomdc is a DC signal of 0V. As illustrated in FIG. 10C, the mask signal Smask is a signal which is in a high level only before and after the timing when the AC driving signal Vcomac is transitioned.

The driving unit 54($n$) applies the driving signal Vcom to the driving electrode COML(n) based on the signals illustrated in FIGS. 10A to 10C. In other words, in the case where the signal Sd(n) supplied from the display scan unit 52 is in a high level, the driving unit 54($n$) interprets the instruction as an instruction for the display driving and applies the AC driving signal Vcomac as the display driving signal Vcomd to the driving electrode COML(n) (FIG. 10D). In addition, in the case where the signal St(n) supplied from the touch detection scan unit 53 is in a high level, the driving unit 54($n$) interprets the instruction as an instruction for the touch detection driving and, as illustrated in FIG. 10E, the driving unit 54($n$) applies the AC driving signal Vcomac (pulse portion P1) to the driving electrode COML(n) during the time interval when the mask signal Smask is in a high level and applies the DC driving signal Vcomdc (DC portion P2) during the time interval when the mask signal Smask is in a low level. In other words, the driving unit 54($n$) generates the touch detection driving signal Vcomt having the pulse portion P1 and the DC portion P2 based on the AC driving signal Vcomac, the DC driving signal Vcomdc, and the mask signal Smask and applies the touch detection driving signal Vcomt to the driving electrode COML(n).

In the case where both the signal Sd(n) supplied from the display scan unit 52 and the signal St(n) supplied from the touch detection scan unit 53 are in a high level, the driving unit 54($n$) applies the AC driving signal Vcomac as the display driving signal Vcomd to the driving electrode COML(n) (FIG. 10D). In other words, in the case where the driving unit 54($n$) receives an instruction for both the display driving and the touch detection driving, the driving unit 54($n$) gives priority to the instruction for the display driving. In addition, in the case where both the signal Sd(n) supplied from the display scan unit 52 and the signal St(n) supplied from the touch detection scan unit 53 are in a low level, the driving unit 54($n$) interprets that the instruction is neither the instruction for the display driving nor the instruction for the touch detection driving and applies the DC driving signal Vcomdc to the driving electrode COML(n) (FIG. 10F).

FIG. 11 illustrates one example of operations of the scan driving unit 50. The scan driving unit 50 sequentially applies the display driving signal Vcomd and the touch detection driving signal Vcomt to the driving electrode COML. At this time, in the case where the driving electrode COML, which the display driving signal Vcomd is to be applied to, and the driving electrode COML, which the touch detection driving signal Vcomt is to be applied to, are overlapped with each other (FIG. 11B), due to the aforementioned structure where the priority is given to the display driving, the display driving signal Vcomd is applied to the overlapped driving electrode COML.

Herein, the driving electrode COML corresponds to a specific example of a "common driving electrode" in the present disclosure. The liquid crystal device LC corresponds to a specific example of a "display device" in the present disclosure. The AC driving signal Vcomac corresponds to a specific example of an "AC signal" in the present disclosure. The DC driving signal Vcomdc corresponds to a specific example of a "DC potential" in the present disclosure. The switches SW1 and SW2 correspond to specific examples of a "first switch" and a "second switch" in the present disclosure.

[Operations and Functions]

Subsequently, operations and functions of the touch detection function-attached display apparatus 1 according to the embodiment of the present disclosure are described.

(Overview of Overall Operations)

The controller 11 supplies the control signals to the gate driver 12, the source driver 13, the driving signal generation unit 15, the driving electrode driver 14, and the touch detection unit 40 based on the video signal Vdisp, which is externally supplied, so that the gate driver 12, the source driver 13, the driving signal generation unit 15, the driving electrode driver 14, and the touch detection unit 40 are controlled to operate in synchronization with each other. The gate driver 12 supplies the scan signal Vscan to the liquid crystal display module 20 to sequentially select one horizontal line, which becomes an object of the display driving. The source driver 13 supplies the pixel signal Vpix to each of the pixels Pix which constitute one horizontal line sequentially selected by the gate driver 12. The driving signal generation unit 15 generates the AC driving signal Vcomac and the DC driving signal Vcomdc. In the display operation, the driving electrode driver 14 sequentially applies the AC driving signal Vcomac as the display driving signal Vcomd to the driving electrode COML associated with one horizontal line which becomes an object of the display driving. In the touch detection operation, the driving electrode driver 14 generates the touch detection driving signal Vcomt based on the AC driving signal Vcomac and the DC driving signal Vcomdc and sequentially applies the touch detection driving signal Vcomt to the driving electrode COML associated with the touch detection operation. The touch detection function-attached display module 10 performs the display operation based on the signals supplied to the gate driver 12, the source driver 13, and the driving electrode driver 14, performs the touch detection operation based on the touch detection driving signal Vcomt supplied by the driving electrode driver 14 and outputs the touch detection signal Vdet from the touch detection electrode TDL. The analog LPF unit 42 removes a high frequency component of the touch detection signal Vdet and outputs the remaining touch detection signal Vdet. The A/D converter 43 converts the analog signal output from the analog LPF unit 42 into a digital signal. The signal processing unit 44 detects existence of the touch on the touch detection function-attached display module 10 based on the output signal of the A/D converter 43. When the touch is detected in the signal processing unit 44, the coordinate extraction unit 45 obtains the touch panel coordinate. The detection timing controller 46 controls the analog LPF unit 42, the A/D converter 43, the signal processing unit 44, and the coordinate extraction unit 45 to be operated in synchronization with each other.

Hereinafter, detailed operations of the touch detection function-attached display apparatus 1 will be described.

(Display Operation and Touch Detection Operation)

Figure 12A:
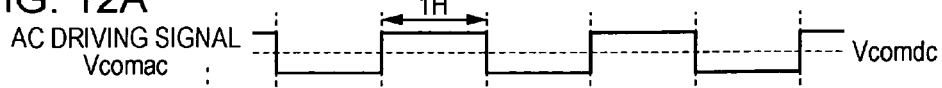
FIGS. 12A to 12E are timing waveform diagrams illustrating an example of operations of the touch detection function-attached display apparatus illustrated in FIG. 4.
Figure 12B:
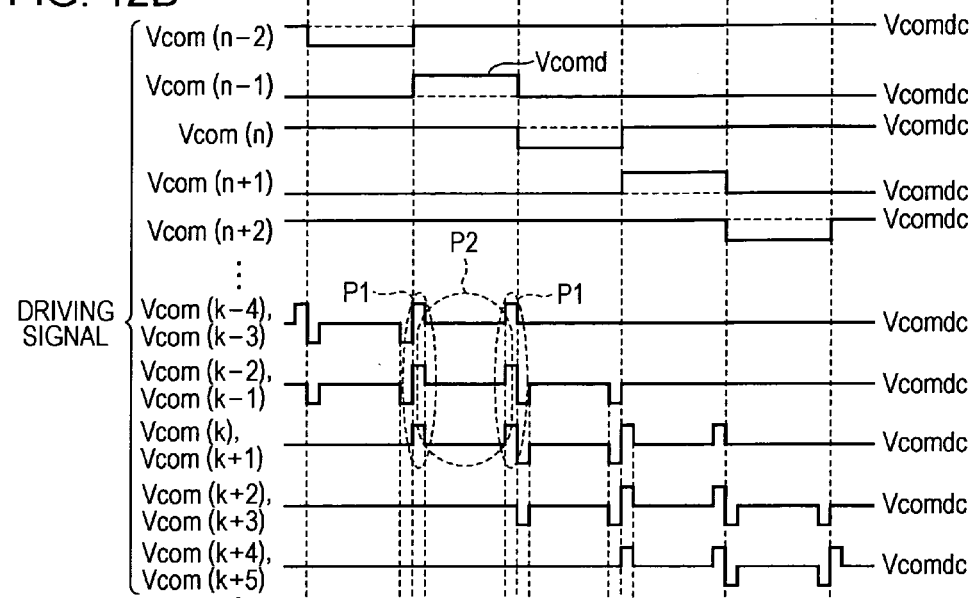
Figure 12C:
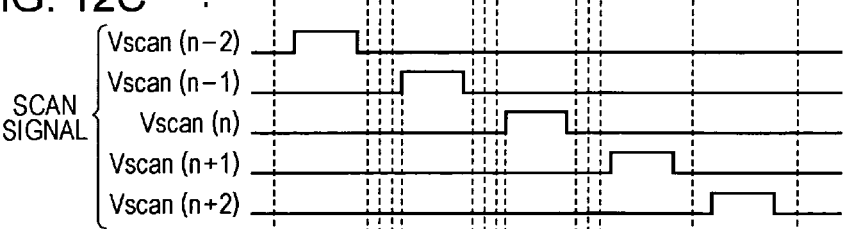
Figure 12D:
Figure 12E:
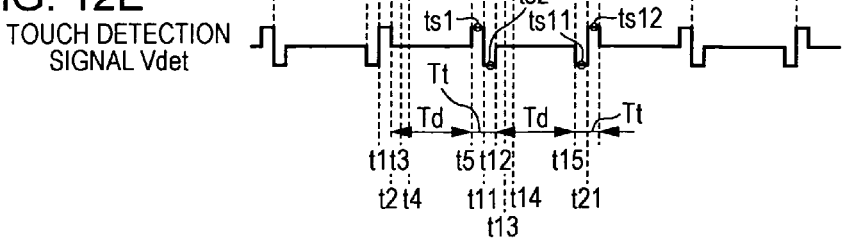

FIGS. 12A to 12E illustrate an example of the display operation and the touch detection operation of the touch detection function-attached display apparatus 1. FIG. 12A illustrates a waveform of the AC driving signal Vcomac. FIG. 12B illustrates a waveform of the driving signal Vcom. FIG. 12C illustrates a waveform of the scan signal Vscan. FIG. 12D illustrates a waveform of the pixel signal Vpix. FIG. 12E illustrates a waveform of the touch detection signal Vdet. As illustrated in FIG. 12B, this example illustrates a case where the driving electrodes COML(n−2) to COML(n+2) of from the (n−2)-th row to the (n+2)-th row are sequentially selected as the objects of the display driving, and the driving electrodes COML(k−4) to COML(k+5) of from the (k−4)-th row to the (k+5)-th row are sequentially selected as the objects of the touch detection driving.

In the touch detection function-attached display apparatus 1, in the display operation, the gate driver 12 applies the scan signal Vscan to the scan signal line GCL (FIG. 12C), and the driving electrode driver 14 sequentially applies the display driving signal Vcomd (the driving signals Vcom(n−2) to Vcom(n+2) in FIG. 12B) to the driving electrode COML corresponding to the scan signal line GCL, so that the display scan is performed. Next, with respect to each one horizontal time interval (1H), the source driver 13 applies the pixel signal Vpix to the one horizontal line which the scan signal Vscan and the display driving signal Vcomd are applied to, so that the display of the one horizontal line is performed. With respect to the touch detection operation, in this example, the driving electrode driver 14 applies the touch detection driving signal Vcomt (the driving signals Vcom(k−4) to Vcom(k+5)) in FIG. 12B) to the six driving electrodes COML and shifts the two driving electrodes COML, which the touch detection driving signal Vcomt is applied to, during each one horizontal time interval, so that the touch detection scan is performed. In other words, the touch detection scan is performed at a scan speed which is twice the scan speed of the display scan. With respect to each one horizontal time interval (1H), the touch detection unit 40 detects the touch based on the touch detection signal Vdet. Hereinafter, the details thereof are described.

First, the driving electrode driver 14 applies the driving signal Vcom to the driving electrode COML at the timing t1. More specifically, the driving electrode driver 14 applies the display driving signal Vcomd (the driving signal Vcom(n−1)) to the driving electrode COML(n−1) of the (n−1)-th row (FIG. 12B). At the same time, the driving electrode driver 14 applies the pulse portion P1 of the touch detection driving signal Vcomt (the driving signals Vcom(k−4) to Vcom(k+1)) to the six driving electrodes COML(k−4) to COML(k+1) of from the (k−4)-th row to the (k+1)-th row (FIG. 12B). Accordingly, one horizontal time interval (1H) is started.

Next, the driving electrode driver 14 applies the DC portion P2 of the touch detection driving signal Vcomt at the timing t2 (FIG. 12B).

Next, at the timing t3, the gate driver 12 applies the scan signal Vscan to the scan signal line GCL(n−1) of the (n−1)-th row, so that the scan signal Vscan(n−1) is changed from a low level to a high level (FIG. 12C).

Next, at the timing t4, the source driver 13 applies the pixel signal Vpix to the pixel signal line SGL (FIG. 12D), so that the display of one horizontal line is performed. After the supplying of the pixel signal Vpix by the source driver 13 is finished, the gate driver 12 changes the scan signal Vscan(n−1) of the scan signal line GCL(n−1) of the (n−1)-th row from a high level to a low level (FIG. 12C).

Next, the driving electrode driver 14 applies the pulse portion P1 of the touch detection driving signal Vcomt at the timing t5 (FIG. 12B). At this time, the touch detection driving signal Vcomt is transferred through the electrostatic capacitance to the touch detection electrode TDL, so that the touch detection signal Vdet is changed (FIG. 12E).

Next, the A/D converter 43 performs A/D conversion on the touch detection signal Vdet at the sampling timing ts1 (FIG. 12E).

Next, the driving electrode driver 14 applies the driving signal Vcom to the driving electrode COML at the timing t11. More specifically, the driving signal generation unit 15 inverts the AC driving signal Vcomac (FIG. 12A), and the driving electrode driver 14 applies the display driving signal Vcomd (the driving signal Vcom(n)) to the driving electrode COML(n) of the n-th row (FIG. 12B). At the same time, the driving electrode driver 14 applies the pulse portion P1 of the touch detection driving signal Vcomt (the driving signals Vcom(k−2) to Vcom(k+3)) to the six driving electrodes COML(k−2) to COML(k+3) of from the (k−2)-th row to the (k+3)-th row (FIG. 12B). Accordingly, the next one horizontal time interval (1H) is started. At this time, the display driving signal Vcomd and the touch detection driving signal Vcomt are transferred through the electrostatic capacitance to the touch detection electrode TDL, so that the touch detection signal Vdet is changed (FIG. 12E).

Next, the A/D converter 43 performs A/D conversion on the touch detection signal Vdet at the sampling timing ts2 (FIG. 12E). In the signal processing unit 44 of the touch detection unit 40, the touch detection is performed based on a difference between the result of the A/D conversion at the sampling timing ts1 and the result of the A/D conversion at the sampling timing ts2.

Next, at the timing t12, the driving electrode driver 14 applies the DC portion P2 of the touch detection driving signal Vcomt (FIG. 12B). Next, at the timing t13, the gate driver 12 applies the scan signal Vscan to the scan signal line GCL(n) of the n-th row, so that the scan signal Vscan(n) is changed from a low level to a high level (FIG. 12D). After that, at the timing t14, the source driver 13 applies the pixel signal Vpix to the pixel signal line SGL (FIG. 12D). In addition, in this example, since the touch detection function-attached display apparatus 1 performs the inversion driving, the pixel signal Vpix applied by the source driver 13 is compared with that of the immediately previous one horizontal time interval, so that the polarity thereof is inverted. After the supplying of the pixel signal Vpix by the source driver 13 is finished, the gate driver 12 changes the scan signal Vscan(n) of the scan signal line GCL(n) of the n-th row from a high level to a low level (FIG. 12C).

Next, at the timing t15, the driving electrode driver 14 applies the pulse portion P1 of the touch detection driving signal Vcomt (FIG. 12B). After the touch detection signal Vdet is changed according to a change of the touch detection driving signal Vcomt (FIG. 12E), the A/D converter 43 performs A/D conversion on the touch detection signal Vdet at the sampling timing ts11 (FIG. 12E).

Next, at the timing t21, the driving electrode driver 14 applies the driving signal Vcom to the driving electrode COML. More specifically, the driving signal generation unit 15 inverts the AC driving signal Vcomac (FIG. 12A), and the driving electrode driver 14 applies the display driving signal Vcomd (the driving signal Vcom(n+1)) to the driving electrode COML(n+1) of the (n+1)-th row (FIG. 12B). At the same time, the driving electrode driver 14 applies the pulse portion P1 of the touch detection driving signal Vcomt (the driving signals Vcom(k) to Vcom(k+5)) to the six driving electrodes COML(k) to COML(k+5) of from the k-th row to the (k+5)-th row (FIG. 12B). After the touch detection signal Vdet is changed according to a change of the display driving signal Vcomd and the touch detection driving signal Vcomt (FIG. 12E), the A/D converter 43 performs A/D conversion on the touch detection signal Vdet at the sampling timing ts12 (FIG. 12E). In the signal processing unit 44 of the touch detection unit 40, the touch detection is performed based on a difference between the result of the A/D conversion at the sampling timing ts11 and the result of the A/D conversion at the sampling timing ts12.

After that, by repeating the aforementioned operations, the touch detection function-attached display apparatus 1 sequentially scans the entire surface of the liquid crystal display module 20 to perform the display operation on the entire surface thereof and sequentially scans the entire surface of the touch detection module 30 to perform the touch detection operation on the entire surface thereof.

Next, operations of the scan driving unit 50 during the performing of the aforementioned display operation and touch detection operation are described in detail. Hereinafter, firstly, as the components of the scan driving unit 50, the display scan unit 52, the touch detection scan unit 53, and the driving unit 54 are described, and after that, the scan driving unit 50 is described.

(Detailed Operations of Display Scan Unit 52 and Touch Detection Scan Unit 53)

FIGS. 13A and 13B illustrate an example of the operations of the display scan unit 52. FIG. 13A illustrates a waveform of the AC driving signal Vcomac, and FIG. 13B illustrates a waveform of the output signal Sd.

The display scan unit 52 sequentially outputs the signal having a pulse width corresponding to one horizontal time interval (1H) as the signal Sd at the timing corresponding to the voltage transition of the AC driving signal Vcomac (FIG. 13A) generated by the driving signal generation unit 15. The driving unit 54 generates the scan signal Vscan (for example, the scan signals Vscan(n−2) to Vscan(n+2)) illustrated in FIG. 12C based on the signal Sd (for example, the signals Sd(n−2) to Sd(n+2)) and generates the display driving signal Vcomd (for example, the driving signals Vcom(n−2) to Vcom(n+2)) illustrated in FIG. 12B.

FIGS. 14A and 14B illustrate an example of operations of the touch detection scan unit 53. FIG. 14A illustrates a waveform of the AC driving signal Vcomac. FIG. 14B illustrates a waveform of the output signal St.

In this example, the touch detection scan unit 53 sequentially outputs the signal St so that the six signals are simultaneously in a high level at the timing corresponding to the voltage transition of the AC driving signal Vcomac (FIG. 14A) generated by the driving signal generation unit 15 and the signal St which is in the high level is shifted by two horizontal time intervals in each one horizontal time interval (1H). The driving unit 54 generates the touch detection driving signal Vcomt (for example, the driving signals Vcom(k−4) to Vcom(k+5)) illustrated in FIG. 12B based on the signal St (for example, the signals St(k−4) to St(k+5)).

(Detailed Operations of Driving Unit 54)

FIGS. 15A to 15H illustrate an example of operations of the driving unit 54(n). FIG. 15A illustrates a waveform of the AC driving signal Vcomac. FIG. 15B illustrates a waveform of the DC driving signal Vcomdc. FIG. 15C illustrates a waveform of the mask signal Smask. FIG. 15D illustrates a waveform of the signal Sd(n). FIG. 15E illustrates a waveform of the signal St(n). FIG. 15F illustrates a waveform of the signal Seld. FIG. 15G illustrates a waveform of the scan signal Vscan(n). FIG. 15H illustrates a waveform of the driving signal Vcom(n).

When the signal Sd(n) supplied from the display scan unit 52 is in a high level, as illustrated at the timings t31 to t32, the driving unit 54(n) sets the scan signal Vscan(n) to a high level (FIG. 15G) and outputs the display driving signal Vcomd as the driving signal Vcom(n) (FIG. 15H). More specifically, when the signal Sd(n) is in a high level, the gate buffer 55 generates the scan signal Vscan(n) based the signal Sd(n) and outputs the scan signal Vscan(n) (FIG. 15G). In addition, the logic OR circuit 57 outputs the high level signal as the signal Seld (FIG. 15F), and the driving switch circuit 58 outputs the AC driving signal Vcomac (FIG. 15A) as the display driving signal Vcomd (FIG. 15H). In other words, the driving unit 54(n) interprets the instruction the high level signal Sd(n) and the low level signal St(n) as an instruction for the display driving and supplies the display driving signal Vcomd to the driving electrode COML(n).

When the signal St(n) supplied from the touch detection scan unit 53 is in a high level, as illustrated at the timings t41 to t44, the driving unit 54(n) outputs the touch detection driving signal Vcomt as the driving signal Vcom(n) (FIG. 15H). More specifically, the logic OR circuit 57 outputs the same signal as the mask signal Smask as the signal Seld only during the time interval when the signal St(n) is in a high level (FIG. 15F). In addition, during the time interval when the signal Seld is in a high level, the driving switch circuit 58 outputs the AC driving signal Vcomac (FIG. 15A) (the pulse portion P1 in FIG. 15H), and during the time interval when the signal Seld is in a low level, the driving switch circuit 58 outputs the DC driving signal Vcomdc (FIG. 15B) (the DC portion P2 in FIG. 15H), so that the touch detection driving signal Vcomt is generated and output. In other words, the driving unit 54(n) interprets the high level signal St(n) and the low level signal Sd(n) as an instruction for the touch detection driving and supplies the touch detection driving signal Vcomt to the driving electrode COML(n).

Hereinbefore, the case is described where one of the signal Sd supplied from the display scan unit 52 and the signal St supplied from the touch detection scan unit 53 is in a high level and the other is in a low level. However, there is a case where both of the signals are in a high level. Hereinafter, this state is described.

As illustrated in FIG. 12, in the display operation, when the driving electrode driver 14 is to apply the display driving signal Vcomd to the driving electrode COML, the driving electrode driver 14 performs sequential scan by shifting one driving electrode COML, which is an object of the application, during each one horizontal time interval; and in the touch detection operation, when the driving electrode driver 14 is to apply the touch detection driving signal Vcomt to the driving electrode COML, the driving electrode driver 14 performs sequential scan by shifting two driving electrodes COML during each one horizontal time interval. In other words, in this example, the touch detection scan is performed at a scan speed which is twice the scan speed of the display scan.

Figure 16:
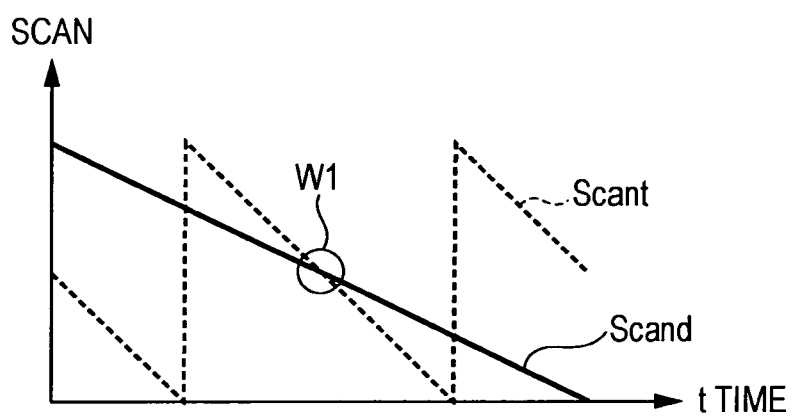
FIG. 16 is a schematic diagram illustrating an example of operations of the touch detection function-attached display apparatus illustrated in FIG. 4.

FIG. 16 schematically illustrates the display scan and the touch detection scan. In the touch detection function-attached display apparatus 1, the scan driving unit 50 may independently perform the display scan Scand and the touch detection scan Scant, so that the display driving signal Vcomd for the display operation and the touch detection driving signal Vcomt for the touch detection operation may be separately applied to the driving electrode COML. At this time, the speed of the touch detection scan Scant may be set to be different from the speed of the display scan Scand, so that it is possible to increase the scan speed of the touch detection. Therefore, the touch by the externally approaching object may be immediately responded to, so that it is possible to improve response characteristics with respect to the touch detection.

As illustrated in FIG. 16, since the speed of the touch detection scan is higher than the speed of the display scan, the display scan Scand is overtaken by the touch detection scan Scant at the timing W1. At this time, the driving electrode COML which is an object of the display driving and the driving electrode COML which is an object of the touch detection driving are overlapped. In other words, the driving unit 54(n) associated with the driving electrode COML(n) is supplied with the high level signal Sd(n) from the display scan unit 52 and is supplied with the high level signal St(n) from the touch detection scan unit 53.

As illustrated in FIGS. 15A to 15H, when both the signal Sd(n) supplied from the display scan unit 52 and the signal St(n) supplied from the touch detection scan unit 53 are in a high level, the driving unit 54(n) sets the scan signal Vscan(n) to the high level (FIG. 15G) and outputs the display driving signal Vcomd as the driving signal Vcom(n) (FIG. 15H). More specifically, first, at the timings t51 to t52, when only the signal St(n) is in a high level, the logic OR circuit 57 outputs the same signal as the mask signal Smask as a signal Seld (FIG. 15F), and the driving switch circuit 58 generates the touch detection driving signal Vcomt based on the signal Seld and outputs the touch detection driving signal Vcomt (FIG. 15H). Next, at the timings t52 to t53, if the signal Sd(n) is in a high level, the gate buffer 55 generates the scan signal Vscan(n) based on the signal Sd(n) and outputs the scan signal Vscan(n) (FIG. 15G). At the same time, the logic OR circuit 57 outputs a high level signal (FIG. 15F), and the driving switch circuit 58 outputs the AC driving signal Vcomac as the display driving signal Vcomd (FIG. 15H). In other words, in the case where the driving unit 54(n) receives an instruction for both the display driving and the touch detection driving, the driving unit 54(n) gives priority to the display driving and interprets the instructions as an instruction for the display driving. Next, at the timings t53 to t54, when the signal Sd(n) is in a low level, the logic OR circuit 57 outputs the same signal as the mask signal Smask as the signal Seld only during the time interval when the signal St(n) is in a high level (FIG. 15F), and the driving switch circuit 58 generates the touch detection driving signal Vcomt based on the signal Seld and outputs the touch detection driving signal Vcomt (FIG. 15H).

(Detailed Operations of Scan Driving Unit 50)

Figure 17:
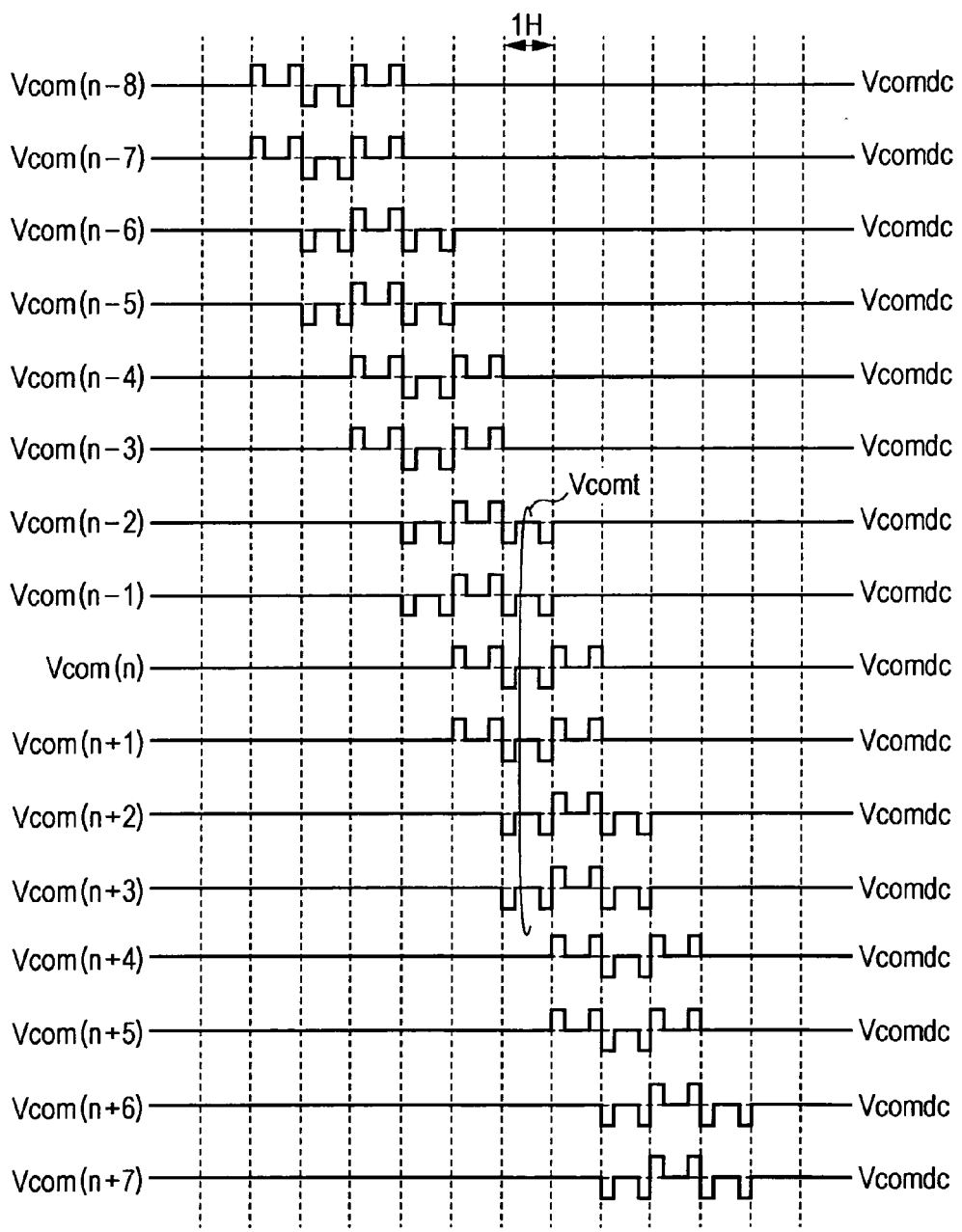
FIG. 17 is a timing waveform diagram illustrating an example of operations of the scan driving unit illustrated in FIG. 8.

FIG. 17 illustrates an example of the touch detection driving operation of the scan driving unit 50. As illustrated in FIG. 17, the scan driving unit 50 applies the touch detection driving signal Vcomt (for example, the driving signals Vcom(n−2) to Vcom(n+3)) to the adjacent six driving electrodes COML (for example, the driving electrodes COML(n−2) to COML(n+3) of from the (n−2)-th row to the (n+3)-th row). Next, the scan driving unit 50 performs the touch detection scan by shifting the two driving electrodes COML, which the touch detection driving signal Vcomt is applied to, during each one horizontal time interval.

Figure 18:
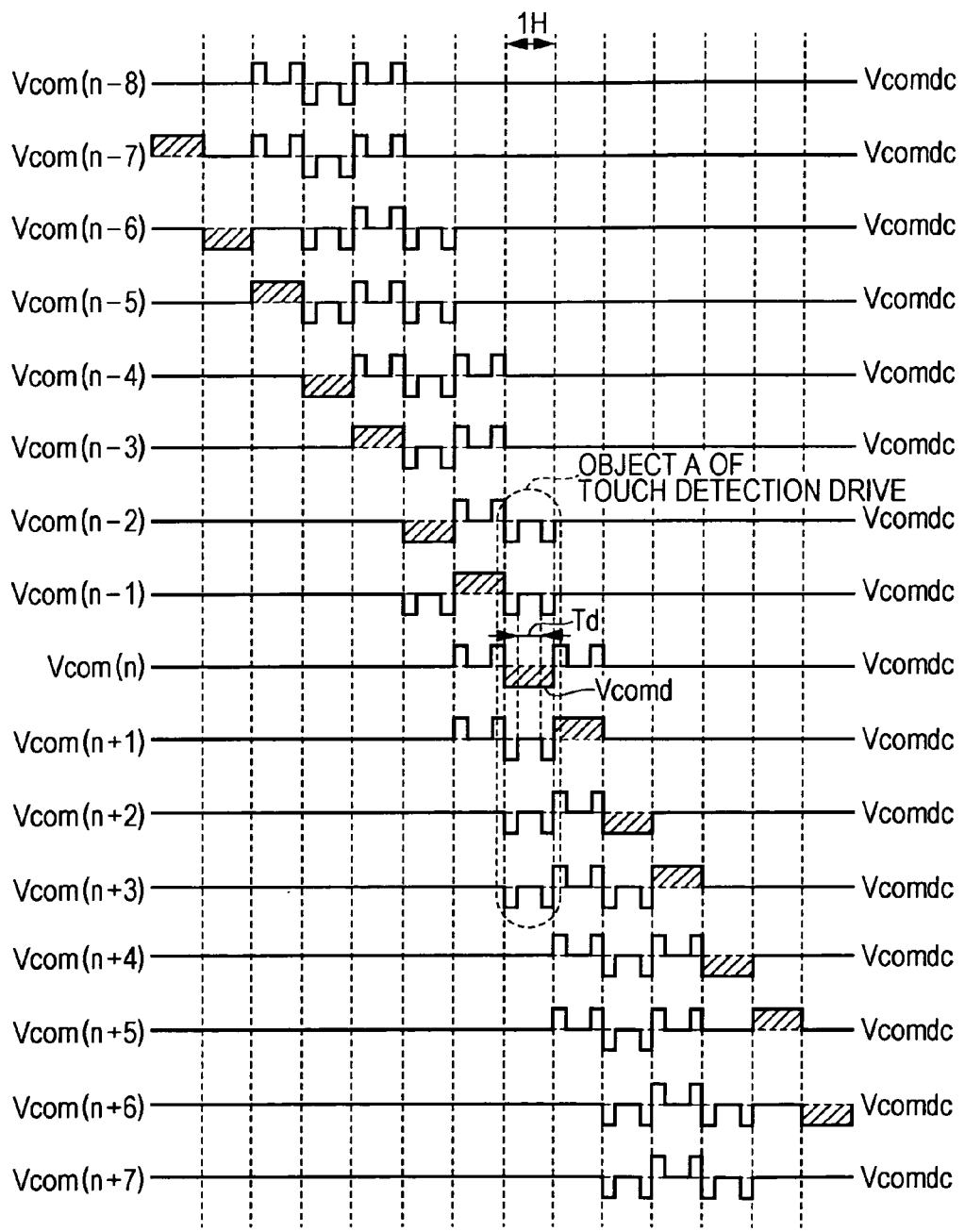
FIG. 18 is a timing waveform diagram illustrating another example of operations of the scan driving unit illustrated in FIG. 8.

FIG. 18 illustrates an example of the display driving operation and the touch detection driving operation of the scan driving unit 50 and the case where the display scan is overtaken by the touch detection scan. In other words, FIG. 18 illustrates the operations in the vicinity of the timing W1 in FIG. 16. The scan driving unit 50 applies the display driving signal Vcomd to the driving electrode COML associated with an object of the display driving and applies the touch detection driving signal Vcomt to the driving electrode COML associated with an object A of the touch detection driving. In FIG. 18, the hatched portions illustrate the display driving signal Vcomd applied to the driving electrode COML associated with the object of the display driving, and during the time interval, the source driver 13 supplies the pixel signal Vpix to the one horizontal line corresponding to the driving electrode COML. In the case where the display scan is overtaken by the touch detection scan, the driving electrode COML associated with the object of the display driving and the driving electrode COML associated with the object A of the touch detection driving are overlapped with each other. At this time, the scan driving unit 50 is operated so that priority is given to the display driving, and as illustrated in FIG. 18, the display driving signal Vcomd is applied to the driving electrode COML.

In this manner, in the touch detection function-attached display apparatus 1, the display driving signal Vcomd is applied to the driving electrode COML associated with the horizontal line, to which the source driver 13 applies the pixel signal Vpix, irrespective of whether or not the state is the overtaken state. In other words, in the touch detection function-attached display apparatus 1, since the scan driving unit 50 is operated so that priority is given to the display driving, the touch detection driving signal Vcomt is not applied to the driving electrode COML associated with the horizontal line, which the pixel signal Vpix is applied to, in the overtaken state. Accordingly, it is possible to suppress the disturbance of display, which is caused by the overtaking, down to the lowest level.

Comparative Example

Next, a scan driving unit 50R according to a comparative example of the embodiment is described. The scan driving unit 50R according to the comparative example is configured so that the high level mask signal Smask in the scan driving unit 50 according to the embodiment is typically used. In other words, a touch detection driving signal Vcomtr output by the scan driving unit 50R has the same waveform as that of the display driving signal Vcomd. In other words, the scan driving unit 50R also uses a display driving signal Vcomd as the touch detection driving signal Vcomtr.

Figure 19:
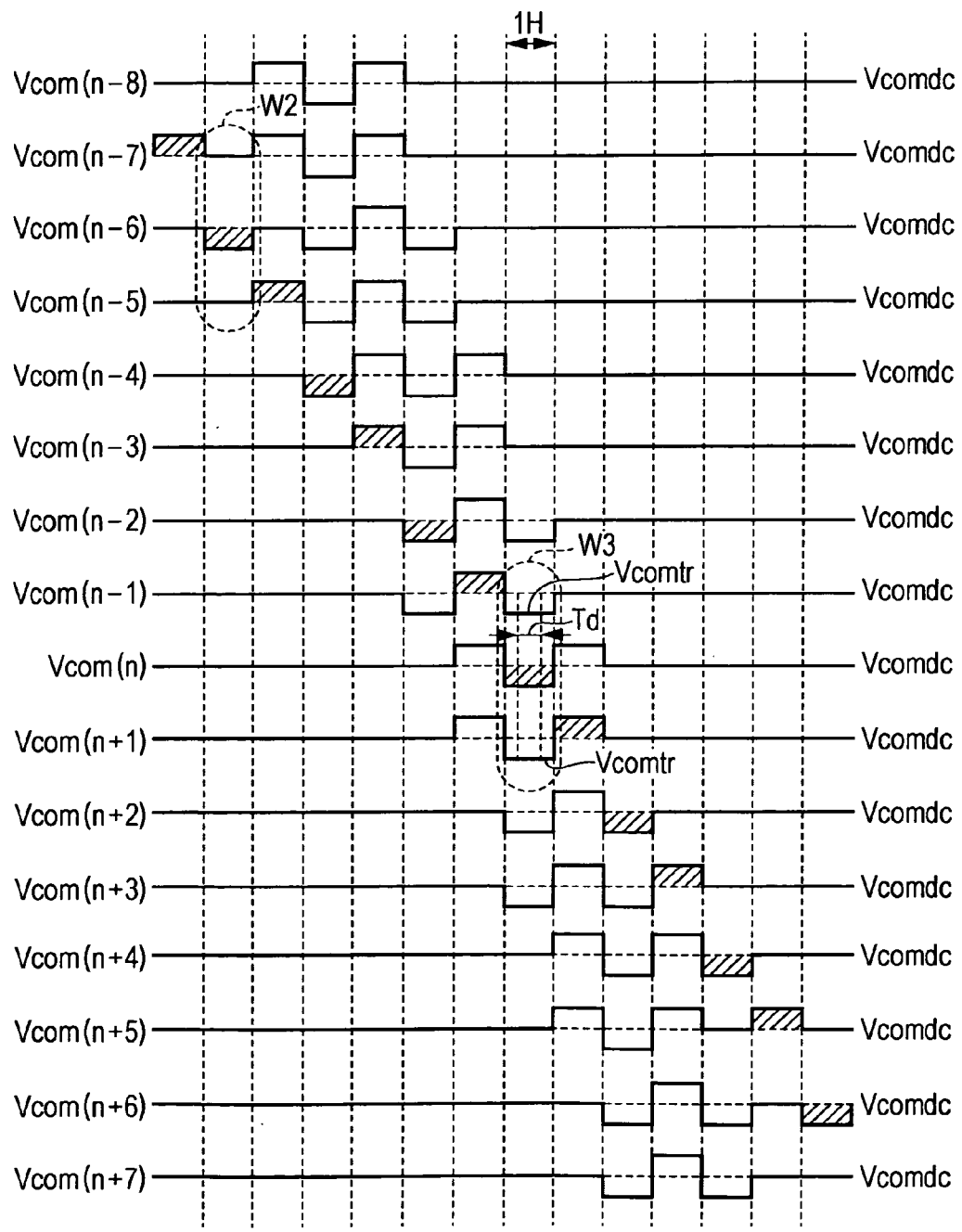
FIG. 19 is a timing waveform diagram illustrating an example of operations of a scan driving unit according to a comparative example.

FIG. 19 illustrates an example of the display driving operation and the touch detection driving operation of the scan driving unit 50R and illustrates the case where the display scan is overtaken by the touch detection scan. The scan driving unit 50R applies the touch detection driving signal Vcomtr having the same waveform as that of the display driving signal Vcomd to the driving electrode COML which is an object of the touch detection. In the case where the display scan is overtaken by the touch detection scan, similarly to the scan driving unit 50 according to the embodiment, the scan driving unit 50R gives priority to the display driving and applies the display driving signal Vcomd to the driving electrode COML. At this time, as illustrated in FIG. 19, with respect to a driving electrode COML adjacent to the driving electrode COML associated with the horizontal line which the pixel signal Vpix is applied to, both the case where the DC driving signal Vcomdc is applied thereto and the case where the touch detection signal Vcomtr is applied thereto exist. In other words, in the case where the state is not an overtaken state, the DC driving signal Vcomdc is applied to the adjacent driving electrode COML (for example, the waveform W2), but in the case where the state is an overtaken state, the touch detection driving signal Vcomtr is applied thereto (for example, the waveform W3).

As illustrated in FIG. 19, in the comparative example, the voltage level of the driving electrode COML adjacent to the driving electrode COML associated with the horizontal line, which the pixel signal Vpix is applied to, is varied according to whether or not the state is an overtaken state. The touch detection driving signal Vcomtr applied to the adjacent driving electrode COML may influence the horizontal line, which the pixel signal Vpix is applied to, for example, through parasitic capacitance, so that there is a problem in that the display of the horizontal line may be varied according to whether or not to be in the overtaken state. More specifically, there is a problem in that, in the overtaken state, the horizontal line which the pixel signal Vpix is applied to may be shown to be "streak".

On the other hand, in the embodiment, the touch detection driving signal Vcomt becomes the DC driving signal Vcomdc in the display time interval Td. In other words, in the display time interval Td, the DC driving signal Vcomdc is typically applied to the driving electrode COML adjacent to the driving electrode COML associated with the horizontal line, to which the source driver 13 applies the pixel signal Vpix, irrespective of whether or not the state is the overtaken state. Therefore, since the display of the horizontal line is not influenced by whether or not the state is the overtaken state, it is possible to suppress the disturbance of display, which is caused by the overtaking, down to the lowest level.

Effects

Hereinbefore, in the embodiment, since the touch detection driving signal which becomes the DC driving signal Vcomdc is used in the display time interval Td, it is possible to suppress the influence on the display of the horizontal line by the touch detection driving signal applied to the adjacent driving electrode down to the lowest level, so that it is possible to reduce the display disturbance when the overtaking scan is performed.

In addition, in the embodiment, since the display scan and the touch detection scan may be independently performed, the scan speed of the touch detection scan may be configured to be higher than the scan speed of the display scan, so that it is possible to improve the response characteristics of the touch detection.

In the aforementioned embodiment, the scan driving unit 50 simultaneously applies the touch detection driving signal Vcomt to the six driving electrode COML, but the present disclosure is not limited thereto. Alternatively, the touch detection driving signal Vcomt may be simultaneously applied to, for example, five or less or seven or more driving electrodes COML.

In the aforementioned embodiment, the scan driving unit 50 allows the two driving electrodes COML, which the touch detection driving signal Vcomt is applied to, to be shifted during each one horizontal time interval, but the present disclosure is not limited thereto. Alternatively, for example, one driving electrode may be shifted, or a predetermined number such as three or more of the driving electrodes may be shifted.

3. Application Examples

Next, application examples of the touch detection function-attached display apparatus which is described as the aforementioned embodiment and modified example are described with reference to FIGS. 20 to 23 and FIGS. 24A to 24G. The touch detection function-attached display apparatus according to the embodiment or the like may be adapted to all the fields of electronic apparatuses such as television apparatuses, digital cameras, notebook type personal computers, portable terminal apparatuses such as mobile phones, or video cameras. In other words, the touch detection function-attached display apparatus according to the embodiment or the like may be adapted to all the fields of electronic apparatuses for displaying a video signal which is externally input or a video signal which is internally generated as an image or a video.

Application Example 1

Figure 20:
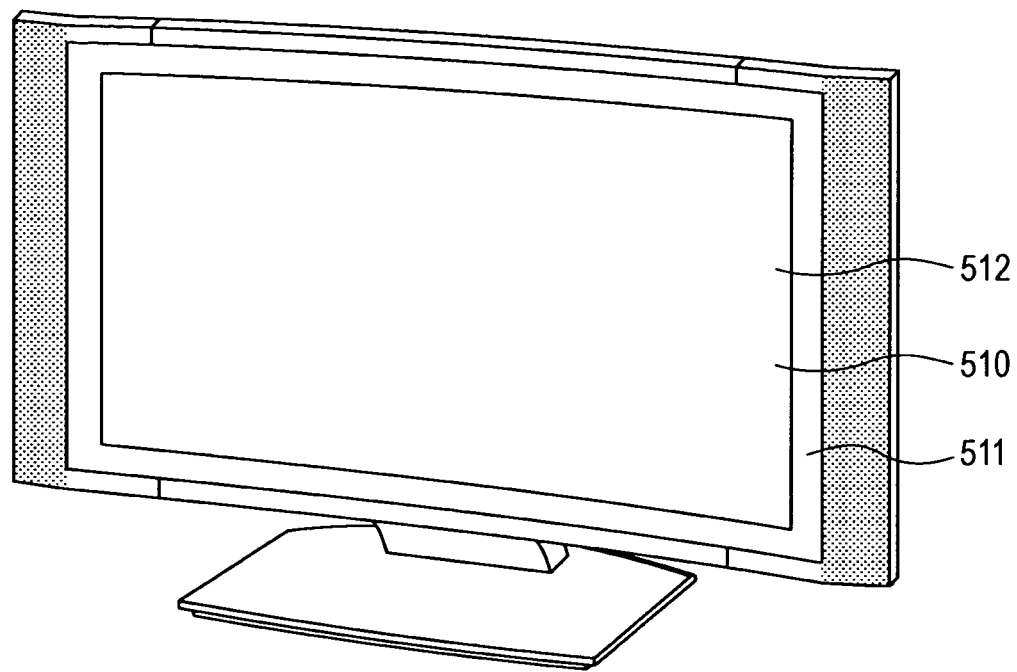
FIG. 20 is a perspective view illustrating a configuration of outer appearance of Application Example 1 of a touch detection function-attached display apparatus according to an embodiment.

FIG. 20 illustrates an outer appearance of a television apparatus where the touch detection function-attached display apparatus according to the embodiment or the like is adapted. The television apparatus includes a video display screen unit 510 having, for example, a front panel 511 and a filter glass 512. The video display screen unit 510 is configured with the touch detection function-attached display apparatus according to the embodiment or the like.

Application Example 2

Figure 21A:
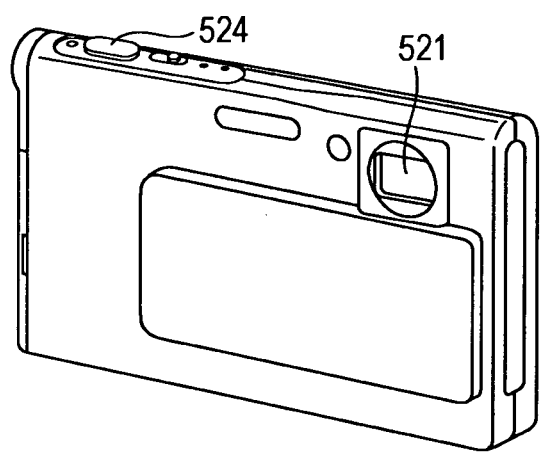
FIGS. 21A and 21B are perspective views illustrating a configuration of outer appearance of Application Example 2.
Figure 21B:
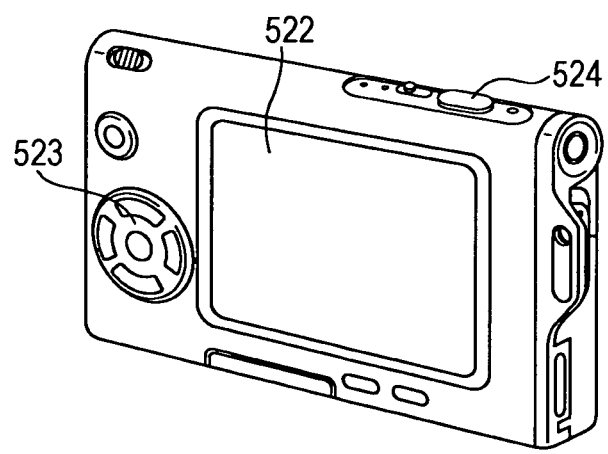

FIGS. 21A to 21B illustrate an outer appearance of a digital camera where the touch detection function-attached display apparatus according to the embodiment or the like is adapted. The digital camera includes, for example, a light emitting unit 521 for flash, a display unit 522, a menu switch 523, and a shutter button 524. The display unit 522 is configured with the touch detection function-attached display apparatus according to the embodiment or the like.

Application Example 3

Figure 22:
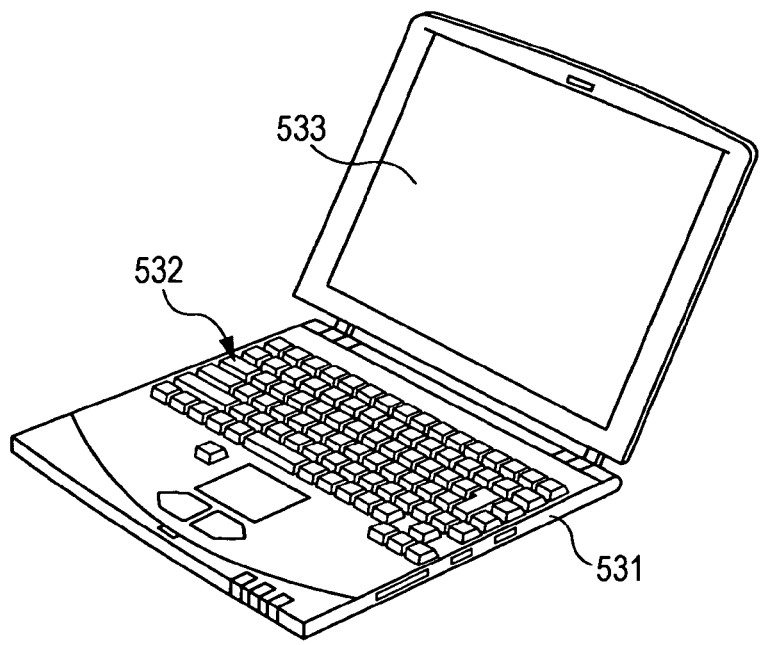
FIG. 22 is a perspective view illustrating a configuration of outer appearance of Application Example 3.

FIG. 22 illustrates an outer appearance of a notebook type personal computer where the touch detection function-attached display apparatus according to the embodiment or the like is adapted. The notebook type personal computer includes, for example, a main body 531, a keyboard 532 for manipulation of inputting characters or the like, and a display unit 533 for displaying an image. The display unit 533 is configured with the touch detection function-attached display apparatus according to the embodiment or the like.

Application Example 4

Figure 23:
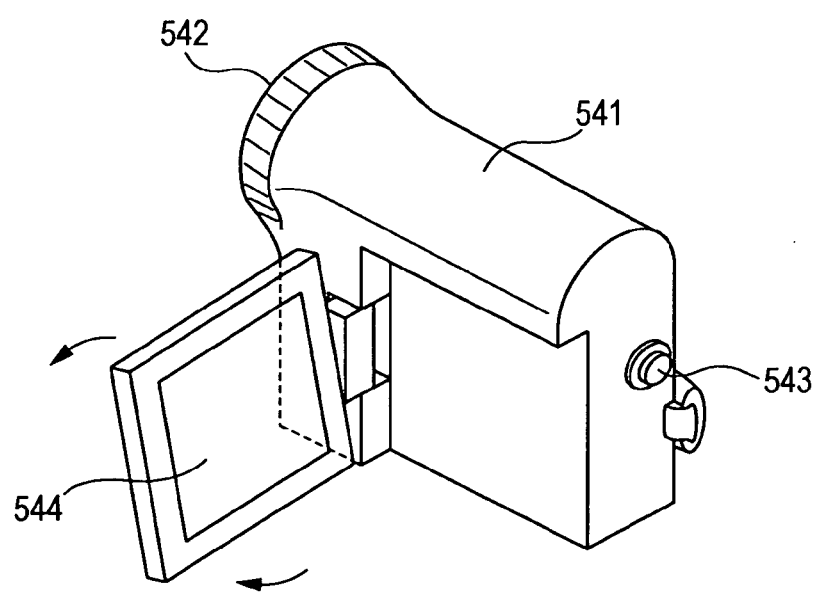
FIG. 23 is a perspective view illustrating a configuration of outer appearance of Application Example 4.

FIG. 23 illustrates an outer appearance of a video camera where the touch detection function-attached display apparatus according to the embodiment or the like is adapted. The video camera includes, for example, a main body unit 541, a subject photographing lens 542 which is disposed on the front side surface of the main body unit 541, a photographing start/stop switch 543, and a display unit 544. The display unit 544 is configured with the touch detection function-attached display apparatus according to the embodiment or the like.

Application Example 5

FIGS. 24A to 24G illustrate outer appearance of a mobile phone where the touch detection function-attached display apparatus according to the embodiment or the like is adapted. The mobile phone is constructed by connecting, for example, an upper case 710 and a lower case 720 with a connect portion (hinge portion) 730 and includes a display 740, a sub-display 750, a picture light 760, and a camera 770. The display 740 or the sub-display 750 is configured with the touch detection function-attached display apparatus according to the embodiment or the like.

Hereinbefore, although the present disclosure is described by using the embodiment and the application examples of electronic apparatuses, the present disclosure is not limited to the embodiment or the like but various modifications are available.

Figure 25:
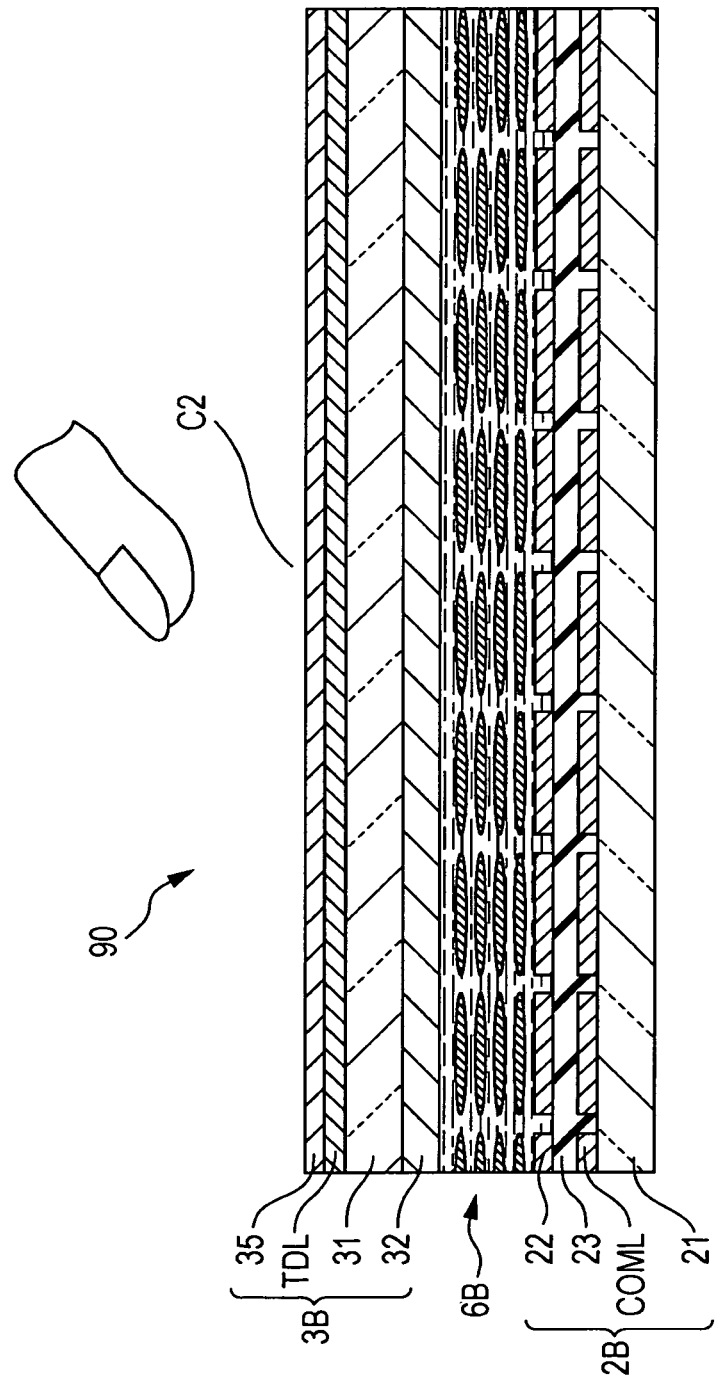
FIG. 25 is a cross-sectional diagram illustrating a schematic cross-sectional structure of a touch detection function-attached display module according to a modified example of the embodiment.

In the aforementioned embodiment or the like, the touch detection function-attached display module 10 is configured by integrating the liquid crystal display module 20 using liquid crystals of various modes such as TN, VA, and ECB and the touch detection module 30. However, alternatively, the liquid crystal display module using liquid crystals of a transverse electric field mode such as FFS (Fringe Field Switching) or IPS (In-Plane Switching) and the touch detection module may also be integrated. For example, in the case of using the liquid crystals of the transverse electric field mode, the touch detection function-attached display module 90 may be configured as illustrated in FIG. 25. This figure illustrates an example of a cross-sectional structure of main components of the touch detection function-attached display module 90 and illustrates the state where a liquid crystal layer 6B is interposed between a pixel substrate 2B and an opposite substrate 3B. Since names, functions, and the like of other components are the same as those of the case of FIG. 5, the description thereof is omitted. In this example, differently from the case of FIG. 5, the driving electrodes COML which are used for the display and the touch detection is formed just on the TFT substrate 21 to constitute a portion of the pixel substrate 2B. Pixel electrodes 22 are disposed above the driving electrodes COML through an insulating layer 23. In this case, all dielectric materials including the liquid crystal layer 6B between the driving electrodes COML and a touch detection electrode TDL contribute to formation of a capacitance C1.

Figure 26A:
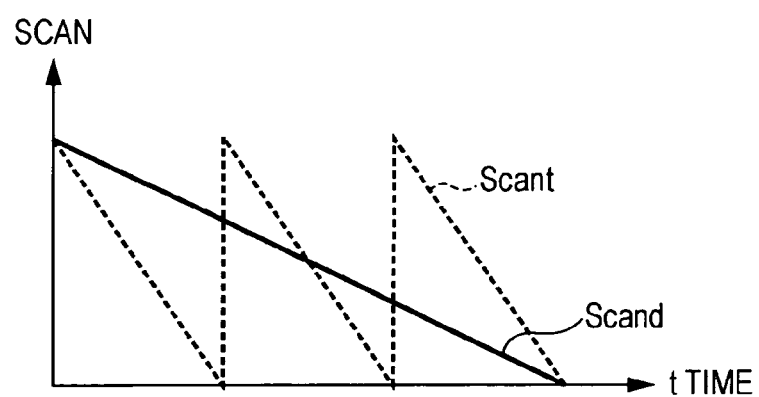
FIGS. 26A and 26B are schematic diagrams illustrating an example of operations of a touch detection function-attached display apparatus according to a modified example of the embodiment.
Figure 26B:
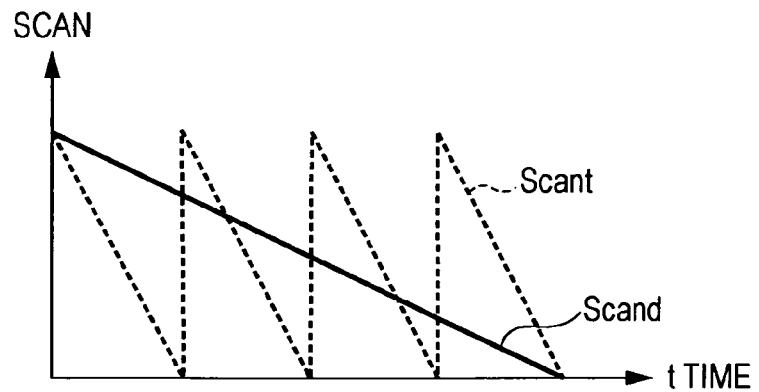

In the aforementioned embodiment or the like, although the touch detection scan is configured to be performed at the speed which is twice the speed of the display scan, the present disclosure is not limited thereto. If the overtaking scan is achieved, any speed may be used. For example, as illustrated in FIG. 26A, the touch detection scan may be performed at a speed which is three times the speed of the display scan; and as illustrated in FIG. 26B, the touch detection scan may be performed at a speed which is four times the speed of the display scan.

The present disclosure contains subject matter related to that disclosed in Japanese Priority Patent Application JP 2010-209716 filed in the Japan Patent Office on Sep. 17, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A touch detection function-attached display apparatus comprising:
    a plurality of common driving electrodes which are disposed in parallel so as to extend in one direction and are applied with an AC signal and a DC potential;
    a display device which has a plurality of pixel electrodes and performs display based on a pixel signal applied to the plurality of pixel electrodes and a display driving signal applied to the plurality of common driving electrodes;
    a touch detection device which has a touch detection electrode and detects an externally approaching object based on a touch detection signal outputted from the touch detection electrode with a touch detection driving signal applied to the plurality of common driving electrodes; and
    a scan driving unit which
        performs a first scan driving in which the display driving signal is sequentially applied to the plurality of the common driving electrodes in a time division manner and the pixel signal is applied to a pixel electrode corresponding to a common driving electrode which is applied with the display driving signal, in synchronization with the application of the display driving signal,
        performs a second scan driving in which the touch detection driving signal is sequentially applied to the plurality of the common driving electrodes in a time division manner at a scan speed different from that of the first scan driving, and applies the DC potential to the common driving electrodes which are not selected as an object of the first scan driving and the second scan driving, wherein, in the first scan driving, the scan driving unit applies the AC signal as the display driving signal to the plurality of common driving electrodes, the touch detection driving signal includes a DC portion and a pulse portion, a horizontal time interval includes a pixel signal application time interval where the pixel signal is applied to the display device, and a time interval other than the pixel signal application time interval, in the second scan driving, the scan driving unit applies the DC potential as the DC portion to the plurality of common driving electrodes in the pixel signal application time interval and applies the AC signal as the pulse portion to the plurality of common driving electrodes in the time interval other than the pixel signal application time interval, in the first scan driving, the scan driving unit applies the display driving signal to one of the plurality of common driving electrodes for each horizontal time, in the second scan driving, the scan driving unit applies the touch detection driving signal to two or more common driving electrodes, which are adjacent to each other, for each horizontal time, a speed of the second scan driving is higher than that of the first scan driving, and when a common driving electrode which is an object of the first scan driving and one of two or more common driving electrodes which are objects of the second scan driving are overlapped, the scan driving unit applies the display driving signal to the overlapped common driving electrode without applying the touch detection driving signal, and the scan driving unit performs the second scan driving to common driving electrodes other than the overlapped common driving electrode among the two or more common driving electrodes which are objects of the second scan driving by applying the DC potential in the pixel signal application time interval and applying the AC signal in the time interval other than the pixel signal application time interval.

2. The touch detection function-attached display apparatus according to claim 1, wherein the scan driving unit includes a first switch which transfers the AC signal, wherein in the first scan driving, by turning on the first switch, the AC signal is applied as the display driving signal to the common driving electrode, and wherein in the second scan driving, by turning on the first switch in the time interval other than the pixel signal application time interval, the pulse portion of the touch detection driving signal is generated by using the AC signal applied via the first switch, and applied to the common driving electrode.

3. The touch detection function-attached display apparatus according to claim 2, wherein the scan driving unit further includes a second switch which transfers the DC potential, and wherein, by turning on the second switch in the pixel signal application time interval, the DC portion of the touch detection driving signal is generated and applied to the common driving electrode.

4. The touch detection function-attached display apparatus according to claim 3, wherein the scan driving unit applies the DC potential to the common driving electrode by turning on the second switch.

5. The touch detection function-attached display apparatus according to claim 1, wherein the touch detection device detects an externally approaching object by using a change in electrostatic capacitance based on approach or contact of the externally approaching object.

6. The touch detection function-attached display apparatus according to claim 3, wherein the AC signal is a rectangular wave signal.

7. The touch detection function-attached display apparatus according to claim 6, wherein the DC potential is equal to a time average of voltage of the display driving signal.

8. The touch detection function-attached display apparatus according to claim 6, wherein the scan driving unit generates the touch detection driving signal based on a mask signal including pulses spanning before and after the transition of the AC signal, when the pulse of the mask signal is supplied to the scan driving unit, the scan driving unit generates the pulse portion of the touch detection driving signal by turning on the first switch and turning off the second switch, and when the pulse of the mask signal is not supplied to the scan driving unit, the scan driving unit generates the DC portion of the touch detection driving signal by turning off the first switch and turning on the second switch.

9. A driving circuit comprising a scan driving unit configured so that, with respect to a touch detection function-attached display unit having a plurality of common driving electrodes which are disposed in parallel so as to extend in one direction and are applied with an AC signal and a DC potential, a display device which has a plurality of pixel electrodes and performs display based on a pixel signal applied to the plurality of pixel electrodes and a display driving signal applied to the plurality of common driving electrodes, and a touch detection device which has a touch detection electrode and detects an externally approaching object based on a touch detection signal outputted from the touch detection electrode with a touch detection driving signal applied to the plurality of common driving electrodes, the scan driving unit performs a first scan driving in which the display driving signal is sequentially applied to the plurality of the common driving electrodes in a time division manner and the pixel signal is applied to a pixel electrode corresponding to a common driving electrode which is applied with the display driving signal, in synchronization with the application of the display driving signal, performs a second scan driving in which the touch detection driving signal is sequentially applied to the plurality of the common driving electrodes in a time division manner at a scan speed different from that of the first scan driving and applies the DC potential to common driving electrodes which are not selected as an object of the first scan driving and the second scan driving, wherein, in the first scan driving, the scan driving unit applies the AC signal as the display driving signal to the plurality of common driving electrodes, the touch detection driving signal includes a DC portion and a pulse portion, a horizontal time interval includes a pixel signal application time interval where the pixel signal is applied to the display device, and a time interval other than the pixel signal application time interval, in the second scan driving, the scan driving unit applies the DC potential as the DC portion to the plurality of common electrodes in the pixel signal application time interval and applies the AC signal as the pulse portion to the plurality of common driving electrodes in the time interval other than the pixel signal application time interval, in the first scan driving, the scan driving unit applies the display driving signal to one of the plurality of common driving electrodes for each horizontal time, in the second scan driving, the scan driving unit applies the touch detection driving signal to two or more common driving electrodes, which are adjacent to each other, for each horizontal time, a speed of the second scan driving is higher than that of the first scan driving, and when a common driving electrode which is an object of the first scan driving and one of two or more common driving electrodes which are objects of the second scan driving are overlapped, the scan driving unit applies the display driving signal to the overlapped common driving electrode without applying the touch detection driving signal, and the scan driving unit performs the second scan driving to common driving electrodes other than the overlapped common driving electrode among the two or more common driving electrodes which are objects of the second scan driving by applying the DC potential in the pixel signal application time interval and applying the AC signal in the time interval other than the pixel signal application time interval.

10. A driving method for a touch detection function-attached display apparatus including a plurality of common driving electrodes which are disposed in parallel so as to extend in one direction and are applied with an AC signal and a DC potential, a display device which has a plurality of pixel electrodes and performs display based on a pixel signal applied to the plurality of pixel electrodes and a display driving signal applied to the plurality of common driving electrodes, and a touch detection device which has a touch detection electrode and detects an externally approaching object based on a touch detection signal outputted from the touch detection electrode with a touch detection driving signal applied to the plurality of common driving electrodes, the driving method comprising:

performing a first scan driving operation in which display based on a pixel signal and a display driving signal is performed by sequentially applying the display driving signal to the plurality of common driving electrodes in a time division manner and by sequentially performing an operation for applying the pixel signal to a pixel electrode corresponding to a common driving electrode, which is applied with the display driving signal, in synchronization with the application of the display driving signal, in a time division manner;

performing a second scan driving operation in which the touch detection driving signal is sequentially applied to the plurality of the common driving electrodes in a time division manner at a scan speed different from that of the first scan driving operation; and applying the DC potential to common driving electrodes which are not selected as an object of the first and the second scan driving operations, wherein, in the first scan driving, the AC signal is applied as the display driving signal to the plurality of common driving electrodes, the touch detection driving signal includes a DC portion and a pulse portion, a horizontal time interval includes a pixel signal application time interval where the pixel signal is applied to the display device, and a time interval other than the pixel signal application time interval, in the second scan driving, the DC potential is applied as the DC portion to the plurality of common driving electrodes in the pixel signal application time interval and the AC signal is applied as the pulse portion to the plurality of common driving electrodes in the time interval other than the pixel signal application time interval, in the first scan driving, the display driving signal is applied to one of the plurality of common driving electrodes for each horizontal time, in the second scan driving, the touch detection driving signal is applied to two or more common driving electrodes, which are adjacent each other, for each horizontal time, a speed of the second scan driving is higher than that of the first scan driving, and when a common driving electrode which is an object of the first scan driving and one of two or more common driving electrodes which are objects of the second scan driving are overlapped, the display driving signal is applied to the overlapped common driving electrode without the touch detection driving signal being applied, and the second scan driving is performed to common driving electrodes other than the overlapped common driving electrode among the two or more common driving electrodes which are objects of the second scan driving by applying the DC potential in the pixel signal application time interval and applying the AC signal in the time interval other than the pixel signal application time interval.

11. An electronic apparatus comprising:

a touch detection function-attached display apparatus; and a controller which performs operation control using the touch detection function-attached display apparatus;

wherein the touch detection function-attached display apparatus includes:

a plurality of common driving electrodes which are disposed in parallel so as to extend in one direction and are applied with an AC signal and a DC potential;

a display device which has a plurality of pixel electrodes and performs display based on a pixel signal applied to the plurality of pixel electrodes and a display driving signal applied to the plurality of common driving electrodes;

a touch detection device which has a touch detection electrode and detects an externally approaching object based on a touch detection signal outputted from the touch detection electrode with a touch detection driving signal applied to the plurality of common driving electrodes; and a scan driving unit which performs a first scan driving in which the display driving signal is sequentially applied to the plurality of the common driving electrodes in a time division manner and the pixel signal is applied to a pixel electrode corresponding to a common driving electrode which is applied with the display driving signal, in synchronization with the application of the display driving signal, performs a second scan driving in which the touch detection driving signal is sequentially applied to the plurality of the common driving electrodes in a time division manner at a scan speed different from that of the first scan driving, and applies the DC potential to common driving electrodes on which the first scan driving and the second scan driving are not performed, and wherein, in the first scan driving, the scan driving unit applies the AC signal as the display driving signal to the plurality of common driving electrodes, the touch detection driving signal includes a DC portion and a pulse portion, a horizontal time interval includes a pixel signal application time interval where the pixel signal is applied to the display device, and a time interval other than the pixel signal application time interval, in the second scan driving, the scan driving unit applies the DC potential as the DC portion to the plurality of common driving electrodes in the pixel signal application time interval and applies the AC signal as the pulse portion to the plurality of common driving electrodes in the time interval other than the pixel signal application time interval, in the first scan driving, the scan driving unit applies the display driving signal to one of the plurality of common driving electrodes for each horizontal time, in the second scan driving, the scan driving unit applies the touch detection driving signal to two or more common driving electrodes, which are adjacent to each other, for each horizontal time, a speed of the second scan driving is higher than that of the first scan driving, and when a common driving electrode which is an object of the first scan driving and one of two or more common driving electrodes which are objects of the second scan driving are overlapped, the scan driving unit applies the display driving signal to the overlapped common driving electrode without applying the touch detection driving signal, and the scan driving unit performs the second scan driving to common driving electrodes other than the overlapped common driving electrode among the two or more common driving electrodes which are objects of the second scan driving by applying the DC potential in the pixel signal application time interval and applying the AC signal in the time interval other than the pixel signal application time interval.

* * * * *